United States Patent [19]
Yamada et al.

[11] Patent Number: 6,157,504
[45] Date of Patent: Dec. 5, 2000

[54] OPTICAL FILTER COMPRISING TRANSPARENT SUPPORT AND FILTER LAYER HAVING TWO ABSORPTION MAXIMUMS

[75] Inventors: Tsukasa Yamada; Taku Nakamura; Toru Harada; Isao Ikuhara; Yoshiharu Yabuki, all of Minami-ashigara, Japan

[73] Assignee: Fuji Photo Film Co., Ltd., Minami-Ashigara, Japan

[21] Appl. No.: 09/421,543

[22] Filed: Oct. 20, 1999

[30] Foreign Application Priority Data

Oct. 20, 1998 [JP] Japan ................................. 10-316874
Mar. 4, 1999 [JP] Japan ................................. 11-057325
Mar. 4, 1999 [JP] Japan ................................. 11-057326
Mar. 4, 1999 [JP] Japan ................................. 11-057327

[51] Int. Cl.$^7$ ............................. G02B 5/22; G02B 5/02; G02B 5/23; H01J 5/16; H01J 31/00
[52] U.S. Cl. ......................... 359/885; 252/582; 252/586; 313/112; 313/478
[58] Field of Search ..................................... 359/885, 590; 252/582, 586, 587; 313/478, 112; 430/7, 345

[56] References Cited

U.S. PATENT DOCUMENTS 5,271,872 12/1993 Sallavanti et al. ...................... 252/582
5,426,018 6/1995 Hibino et al. ............................ 252/586
5,569,766 10/1996 Waggoner et al. ...................... 548/150

*Primary Examiner*—Audrey Chang
*Attorney, Agent, or Firm*—Burns, Doane, Swecker & Mathis, LLP

[57] ABSTRACT

An optical filter comprises a transparent support and a filter layer. The filter layer has an absorption maximum in the wavelength range of 500 to 550 nm. The filter layer further has another absorption maximum in the wavelength range of 560 to 620 nm. The optical filter has a transmittance in the range of 40 to 85% at the absorption maximum in the wavelength range of 500 to 550 nm. The optical filter further has a transmittance in the range of 0.01 to 80% at the absorption maximum in the wavelength range of 560 to 620 nm.

17 Claims, 2 Drawing Sheets

OPTICAL FILTER COMPRISING TRANSPARENT SUPPORT AND FILTER LAYER HAVING TWO ABSORPTION MAXIMUMS

FIELD OF THE INVENTION

The present invention relates to an optical filter comprising a transparent support and a filter layer. In more detail, the invention relates to an optical filter covering a display surface of a display device such as a liquid crystal display device (LCD), a plasma display panel (PDP), an electroluminescence display (ELD), a cathode-ray tube (CRT), a fluorescent indicator tube or a field-emission display to improve the color reproducibility of the display.

BACKGROUND OF THE INVENTION

A display device such as a liquid crystal display device (LCD), a plasma display panel (PDP), an electroluminescence display (ELD), a cathode-ray tube (CRT), a fluorescent indicator tube or a field emission display displays a color image with a combination of the three primary colors (i.e., red, blue, green). However, it is very difficult (substantially impossible) to use the ideal three primary colors. For example, the plasma display panel uses phosphors of the three primary colors, which emit light containing an unnecessary component (in the wavelength region of 500 to 620 nm). Therefore, it has been proposed to correct the color balance of the displayed image by an optical filter absorbing the unnecessary component. The optical filter for the color correction is described in Japanese Patent Provisional Publication Nos. 58(1983)-153904, 60(1985)-118748, 60(1985)-18749, 61(1986)-188501, 3(1991)-231988, 5(1993)-203804, 5(1993)-205643, 7(1995)-307133, 9(1997)-145918, 9(1997)-306366 and 10(1998)-26704.

The display device needs prevention of reflection as well as the color correction. On the screen of the display device, the surrounding scene is often reflected to impair the contrast of the displayed image. Various anti-reflection films have been proposed to solve the problem of reflection. The known anti-reflection layers are categorized into two types, namely evaporating (and depositing) layers and coating layers. The evaporating layers are superior to the coating layers in view of optical characteristics, but the coating layers are easily formed compared with the evaporating layers.

The evaporating layers have been used as anti-reflection films for lenses of glasses or cameras. The layers are generally formed by a vacuum deposition process, a spattering method, an ion plating method, a CVD method or a PVD method.

The coating layers can be formed by coating a dispersion of fine particles and a binder. The coating layers are described in Japanese Patent Provisional Publication Nos. 59(1984)-49501, 59(1984)-50401, 60(1985)-59250 and 7(1995)-48527.

The anti-reflection layers can be introduced into the optical filters. The optical filters having the anti-reflection layers are disclosed in Japanese Patent Provisional Publication Nos. 61(1986)-188501, 5(1993)-205643, 9(1996)-145918, 9(1996)-306366 and 10(1997)-26704. The optical filter described in 61(1986)-188501, 5(1993)-205643, 9(1996)-145918 or 9(1996)-306366 has a transparent support containing a dye or a pigment so that the support functions as an optical filter. Further, the optical filter described in 10(1997)-26704 comprises a colored hard coating (surface hardening) layer provided between a support and an anti-reflection layer, so that the hard coating layer functions as an optical filter.

SUMMARY OF THE INVENTION

A colored transparent support or a colored hard coating layer can function as an optical filter. However, it is difficult to incorporate a dye or pigment into the support or the hard coating layer.

The transparent support is made of glass or plastics (usually, plastics). Therefore, the dye or pigment contained in the support must have enough heat resistance to a high temperature in the production process of the support.

The hard coating layer generally comprises a cross-linked polymer. In forming the layer, the polymer is cross-linked after coating a polymer solution. The dye or pigment added in the solution often fades at the cross-linking reaction.

Various absorption spectra are required for color correction of various display devices. The restricted kinds of dyes or pigments, which can be contained in the support or the hard coating layer, do not satisfy the requirement for color correction.

The applicants have tried to add dyes or pigments not to the support or the hard coating layer (which restricts the dyes or pigments), but to another layer to obtain color correction appropriate for a display device.

An object of the present invention is to provide an optical filter having a function of correcting color appropriately for a displayed image.

The present invention provides an optical filter which comprises a transparent support and a filter layer, wherein the filter layer has an absorption maximum in the wavelength range of 500 to 550 nm and another absorption maximum in the wavelength range of 560 to 620 nm, and wherein the optical filter has a transmittance in the range of 40 to 85% at the absorption maximum in the wavelength range of 500 to 550 nm and a transmittance in the range of 0.01 to 80% at the absorption maximum in the wavelength range of 560 to 620 nm.

The invention also provides a plasma display panel having a display surface covered with an optical filter which comprises a transparent support and a filter layer, wherein the filter layer has an absorption maximum in the wavelength range of 500 to 550 nm and another absorption maximum in the wavelength range of 560 to 620 nm, and wherein the optical filter has a transmittance in the range of 40 to 85% at the absorption maximum in the wavelength range of 500 to 550 nm and a transmittance in the range of 0.01 to 80% at the absorption maximum in the wavelength range of 560 to 620 nm.

In the present invention, a layer other than a transparent support or a hard coating layer functions as a filter layer. Accordingly, there is no specific limitation with respect to dyes or pigments contained in the filter layer. Therefore, the filter layer can have a function of correcting color appropriately for an image.

A display device (such as PDP) uses phosphors of the three primary colors, which emit light containing an unnecessary component in the wavelength region of 500 to 620 nm. According to study of the applicants, the unnecessary light in the wavelength region of 500 to 620 nm can be further divided into two components. One component is in the wavelength region of 500 to 550 nm, and the other component is in the wavelength region of 560 to 620 nm. Accordingly, a color of a displayed image can be more appropriately corrected by filtering the two components separately. In the optical filter of the present invention, the filter layer has an absorption maximum in the wavelength range of 500 to 550 nm (at which the transmittance is in the range of 40 to 85%) and another absorption maximum in the wavelength range of 560 to 620 nm (at which the transmittance is in the range of 0.01 to 80%) to filter the two components separately.

Therefore, the color of the displayed image can be appropriately corrected by the optical filter of the present invention.

DETAILED DESCRIPTION OF THE INVENTION

Layered Structure

Figure 1:
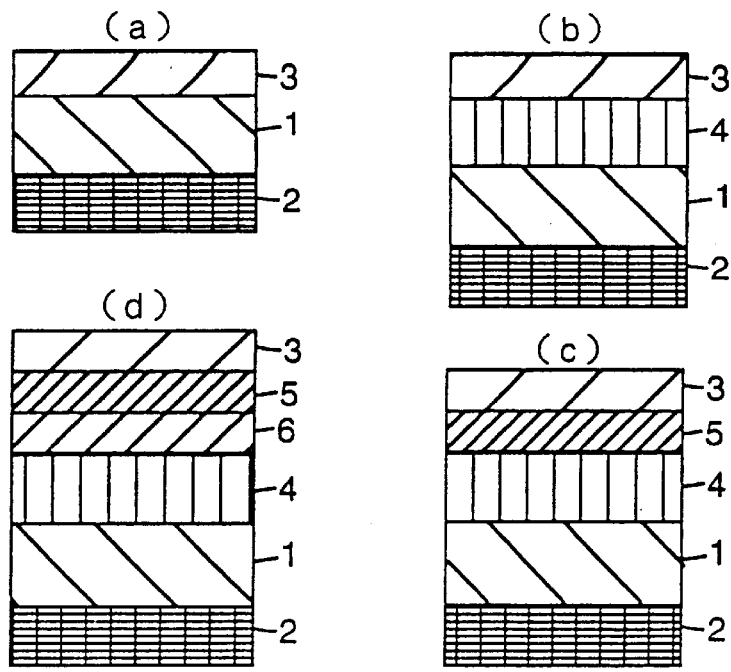
FIG. 1 shows sectional views schematically illustrating an optical filter, which comprises a filter layer, a transparent support and an anti-reflection layer in this order.

FIG. 1 shows sectional views schematically illustrating an optical filter, which comprises a filter layer, a transparent support and an anti-reflection layer in this order.

The embodiment of FIG. 1 (a) comprises a filter layer (2), a transparent support (1) and a low refractive index layer (3) in this order. The layer (3) and the support (1) satisfy the condition of $n_3 < n_1$ in which $n_3$ and $n_1$ represent the refractive indexes of the layer (3) and the support (1) respectively.

The embodiment of FIG. 1 (b) comprises a filter layer (2), a transparent support (1), a hard coating layer (4) and a low refractive index layer (3) in this order.

The embodiment of FIG. 1 (c) comprises a filter layer (2), a transparent support (1), a hard coating layer (4), a high refractive index layer (5) and a low refractive index layer (3) in this order. The layers (3) and (5) and the support (1) satisfy the condition of $n_3 < n_1 < n_5$ in which $n_3$, $n_1$ and $n_5$ represent the refractive indexes of the layer (3), the support (1) and the layer (5) respectively.

The embodiment of FIG. 1 (d) comprises a filter layer (2), a transparent support (1), a hard coating layer (4), a middle refractive index layer (6), a high refractive index layer (5) and a low refractive index layer (3) in this order. The layers (3), (5) and (6) and the support (1) satisfy the condition of $n_3 < n_1 < n_6 < n_5$ in which $n_3$, $n_1$, $n_6$ and $n_5$ represent the indexes of the layer (3), the support (1), the layer (6) and the layer (5) respectively.

Figure 2:
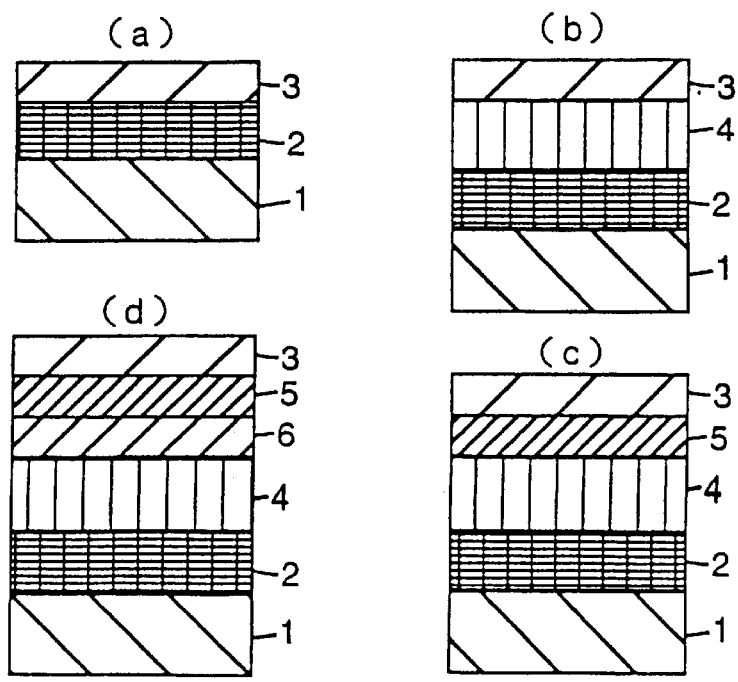
FIG. 2 shows sectional views schematically illustrating another optical filter, which comprises a transparent support, a filter layer and an anti-reflection layer in this order.

FIG. 2 shows sectional views schematically illustrating another optical filter, which comprises a transparent support, a filter layer and an anti-reflection layer in this order.

The embodiment of FIG. 2 (a) comprises a transparent support (1), a filter layer (2) and a low refractive index layer (3) in this order. With respect to the refractive index, the layer (3) and the support (1) satisfy the same condition as that of the embodiment of FIG. 1 (a).

The embodiment of FIG. 2 (b) comprises a transparent support (1), a filter layer (2), a hard coating layer (4) and a low refractive index layer (3) in this order.

The embodiment of FIG. 2 (c) comprises a transparent support (1), a filter layer (2), a hard coating layer (4), a high refractive index layer (5) and a low refractive index layer (3) in this order. With respect to the refractive index, the layers (3) and (5) and the support (1) satisfy the same condition as that of the embodiment of FIG. 1 (c).

The embodiment of FIG. 2 (d) comprises a transparent support (1), a filter layer (2), a hard coating layer (4), a middle refractive index layer (6), a high refractive index layer (5) and a low refractive index layer (3) in this order. With respect to the refractive index, the layers (3), (5) and (6) and the support (1) satisfy the same condition as that of the embodiment of FIG. 1 (d).

Transparent Support

Examples of the materials for the support include cellulose esters (e.g., cellulose diacetate, cellulose triacetate, cellulose propionate, cellulose butyrate, cellulose acetate propionate, cellulose nitrate), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrenes (e.g., syndiotactic polystyrene), polyolefins (e.g., polypropylene, polyethylene, polymethylpentene), polymethyl methacrylate, syndiotactic polystyrene, polysulfone, polyethersulfone, polyetherketone, polyether imide and polyoxyethylene. Cellulose triacetate, polycarbonates and polyethylene terephthalate are preferred.

The transparent support preferably has a transmittance of more than 80%, and more preferably more than 86%. The haze of the support is preferably in the range of less than 2.0%, and more preferably less than 1.0%. The support preferably has a refractive index of 1.45 to 1.70.

The support may contain IR absorber or UV absorber. The amount of the IR absorber is preferably in the range of 0.01 to 20 wt. %, and more preferably in the range of 0.05 to 10 wt. %. The support may further contain particles of an inert inorganic compound as a slipping agent. Examples of the inorganic compounds include $SiO_2$, $TiO_2$, $BaSO_4$, $CaCO_3$, talc and kaolin.

The support can be subjected to surface treatment. Examples of the surface treatment include chemical treatment, mechanical treatment, corona discharge treatment, flame treatment, UV treatment, high-frequency treatment, glow discharge treatment, active plasma treatment, laser treatment, mixed acid treatment and ozone-oxidation treatment. Preferred treatments are glow discharge treatment, UV treatment, corona discharge treatment and flame treatment. Glow discharge treatment and UV treatment are particularly preferred. For enhancing the adhesion between the support and the layer provided thereon, an undercoating layer may be provided on the support.

Undercoating Layer

An undercoating layer is preferably provided between the transparent support and the filter layer. The undercoating layer may contain a polymer having a glass transition temperature of −60 to 60° C. or a polymer compatible with the polymer of the filter layer. On the support surface opposite to the filter layer side, another undercoating layer may be provided to enhance the adhesion between the support and the layers thereon (e.g., anti-reflection layers, hard coating layer). Further, another undercoating layer can be provided to improve the affinity between the optical filter and the adhesive agent for fixing the optical filter onto a display device.

The undercoating layer has a thickness preferably in the range of 2 nm to 20 μm, more preferably in the range of 5 nm to 5 μm, further preferably in the range of 20 nm to 2 μm, furthermore preferably in the range of 50 nm to 1 μm, and most preferably in the range of 80 nm to 300 nm.

The undercoating layer containing a polymer having a glass transition temperature of −60 to 60° C. unites the filter layer to the transparent support with the adhesion of the polymer. The polymer having a glass transition temperature of not higher than 60° C. can be prepared by polymerization or copolymerization of vinyl chloride, vinylidene chloride, vinyl acetate, butadiene, neoprene, styrene, chloroprene, acrylic ester, methacrylic ester, acrylonitrile or methyl vinyl ether. The glass transition temperature is preferably not higher than 50° C., more preferably not higher than 40° C., further preferably not higher than 30° C., furthermore preferably not higher than 25° C., and most preferably not higher than 20° C. The undercoating layer has an elasticity at 25° C. preferably in the range of 1 to 1,000 MPa, more preferably in the range of 5 to 800 MPa, and most preferably in the range of 10 to 500 MPa.

The undercoating layer having a rough surface also unites the filter layer to the transparent support. On the rough surface of the undercoating layer, the filter layer is provided. The undercoating layer having a rough surface can be easily formed by applying a polymer latex. The polymer latex has a mean particle size preferably in the range of 0.02 to 3 μm, and more preferably in the range of 0.05 to 1 μm.

Examples of the polymer compatible with that of the filter layer include acrylic resins, cellulose derivatives, gelatin, casein, starch, polyvinyl alcohol, soluble nylon and polymer latex.

Two or more undercoating layers can be provided on the support.

The undercoating layer can contain other components such as a solvent for swelling the support, a matting agent, a surface active agent, an antistatic agent, a coating aid and a curing agent.

Filter Layer

The filter layer preferably has a thickness of 1 to 15 μm.

The filter layer has an absorption maximum in the wavelength range (green) of 500 to 550 nm as well as an absorption maximum in the wavelength range (between green and red) of 560 to 620 nm.

The transmittance at the absorption maximum in the wavelength range of 500 to 550 nm is in the range of 40 to 85%, and preferably in the range of 50 to 85%.

The absorption maximum in the wavelength range of 500 to 550 nm is arranged to adjust the emission strength of green fluorescence, which has a high visual sensitivity. The green fluorescence is preferably cut moderately. The absorption maximum in the wavelength range of 500 to 550 nm has a half-width (width at half of the absorption maximum) preferably in the range of 30 to 300 nm, more preferably in the range of 40 to 300 nm, further preferably in the range of 50 to 150 nm, and most preferably in the range of 60 to 150 nm.

The transmittance at the absorption maximum in the wavelength range of 560 to 620 nm is in the range of 0.01 to 80%, preferably in the range of 0.02 to 75%, more preferably in the range of 0.05 to 70%, further preferably in the range of 0.2 to 65%, furthermore preferably in the range of 1 to 60%, and most preferably in the range of 5 to 50%.

The absorption maximum in the wavelength range of 560 to 620 nm is arranged to selectively cut a sub-band, which degrades purity of red fluorescence. The absorption maximum in the wavelength range of 560 to 620 nm can further cut an unnecessary light about 595 nm, which is emitted by excitation of neon gas in PDP. In the optical filter of the present invention, the two absorption maximums are separately arranged. Therefore, the unnecessary light can be selectively cut without influence on the color of the green fluorescence. The influence on the green fluorescence can be further reduced by obtaining a sharp peak in the absorption spectrum. The absorption maximum in the wavelength range of 560 to 620 nm has a half-width preferably in the range of 5 to 300 nm, more preferably in the range of 10 to 200 nm, further preferably in the range of 10 to 100 nm, furthermore preferably in the range of 10 to 80 nm, and most preferably in the range of 15 to 50 nm.

The transmittance at the absorption maximum in the wavelength range of 500 to 550 nm is preferably larger than the transmittance at the absorption maximum in the wavelength range of 560 to 620 nm. Further, the half-width of the absorption maximum in the wavelength range of 500 to 550 nm is preferably larger than the half-width of the absorption maximum in the wavelength range of 560 to 620 nm.

The above-described absorption spectrum of the filter layer can be obtained by adding a dye or pigment (preferably dye) to the filter layer.

A squarylium dye, an azomethine dye, a cyanine dye, an oxonol dye, an azo dye or an arylidene dye can be used as a dye having an absorption maximum in the wavelength range of 500 to 550 nm. Examples of the dyes having an absorption maximum in the wavelength range of 500 to 550 nm are shown below.

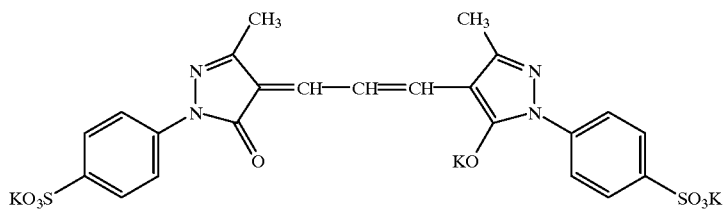

(a1)

-continued
(a2)
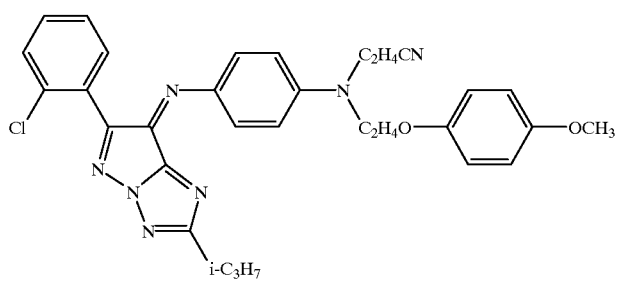
(a3)
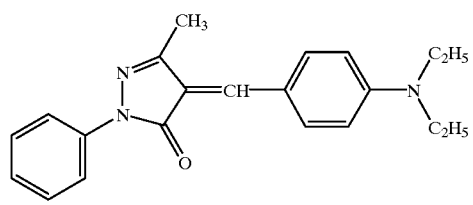
(a4)
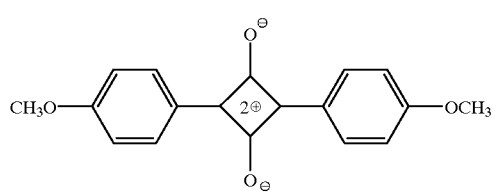
(a5)
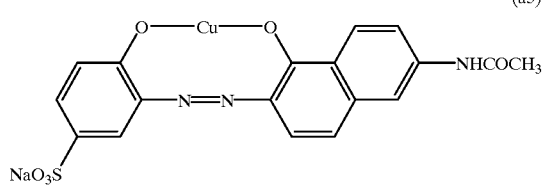
(a6)
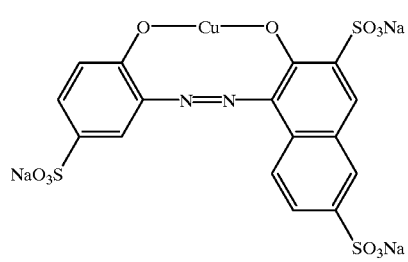
(a7)
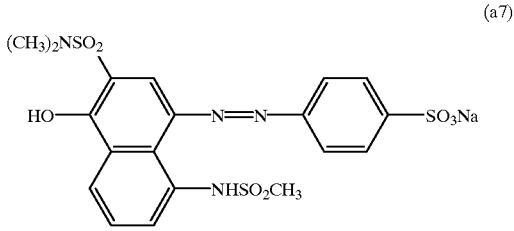
(a8)
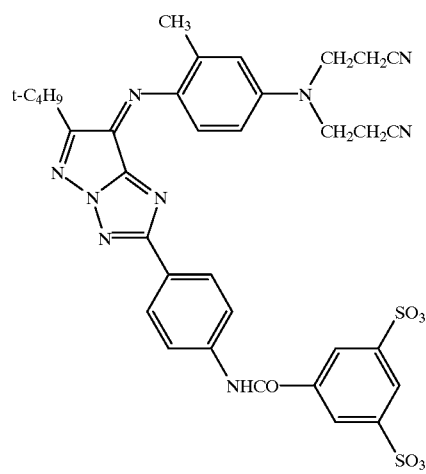
(a9)
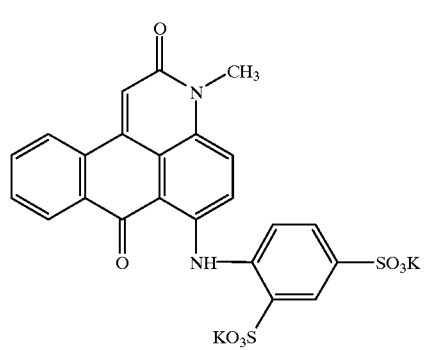
(a10)
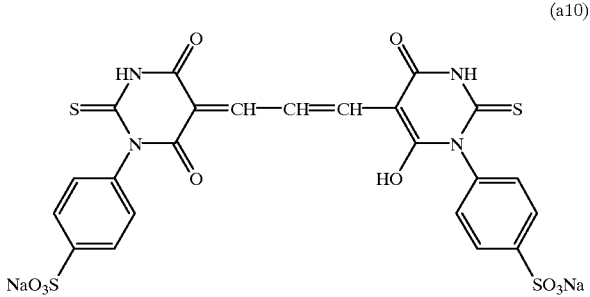

(a11) 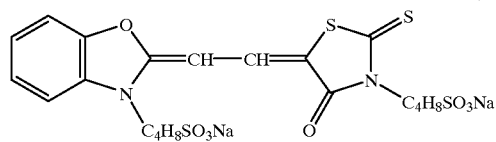
(a12) 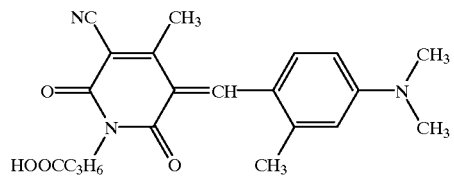
(a13) 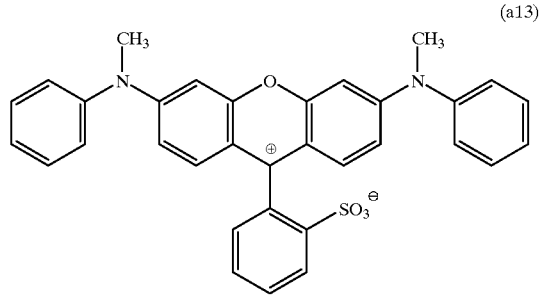
(a14) 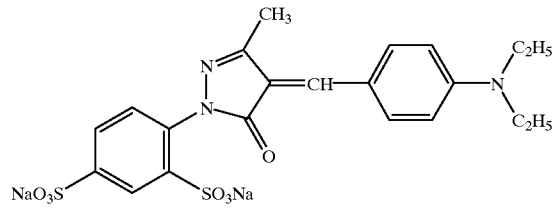
A cyanine dye, a squarylium dye, an azomethine dye, a xanthene dye, an oxonol dye or an azo dye can be used as a dye having an absorption maximum in the wavelength range of 560 to 620 nm. Examples of the dyes having an absorption maximum in the wavelength range of 560 to 620 nm are shown below.
(b1) 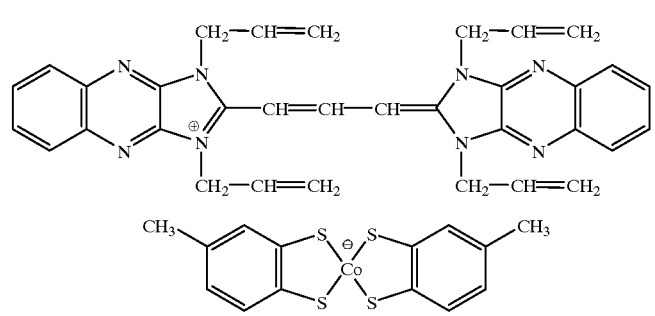
(b2) 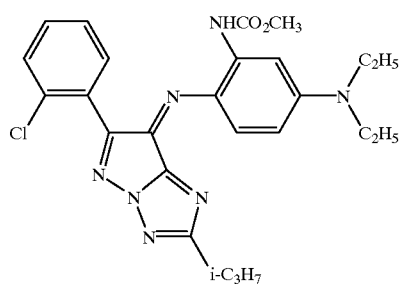
(b3) 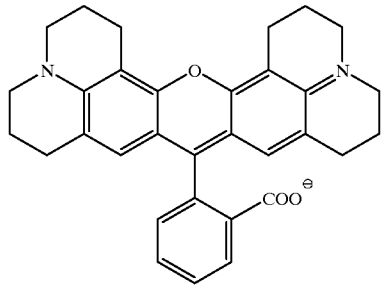
(b4) 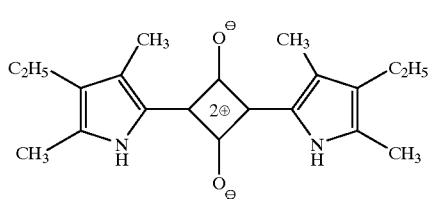
(b5) 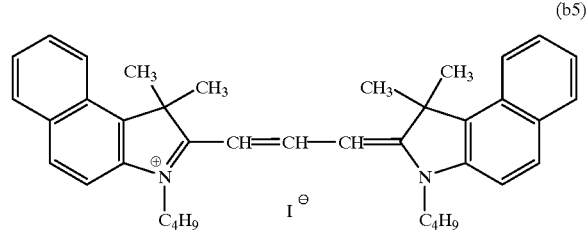

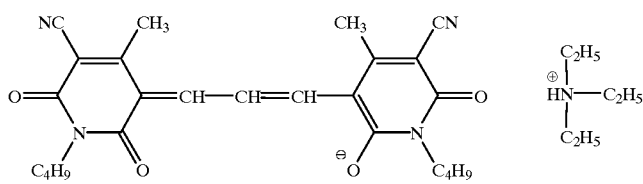

(b6)

In the filter layer, the above-described two dyes can be used in combination.

Further, the filter layer can contain a dye having two absorption maximums in the wavelength range of 500 to 550 nm as well as in the wavelength range of 560 to 620 nm. A dye in an aggregated form (such as in the form of a particle dispersion) usually has an absorption maximum in a long wavelength region compared with the same dye in an non-aggregated form. In other words, the absorption maximum of a dye can be shifted to a long wavelength region by changing the non-aggregated form to the aggregated form. Further, the peak at the absorption maximum of an aggregated form is sharper than that of a non-aggregated form.

Therefore, a dye (in a non-aggregated form) having an absorption maximum in the wavelength range of 500 to 550 nm sometimes further has an absorption maximum in the wavelength range of 560 to 620 nm (in an aggregated form). The two absorption maximums in the wavelength range of 500 to 550 nm (a non-aggregated form) as well as in the wavelength range of 560 to 620 nm (an aggregated form) can be obtained by using the above-described dye in a partially aggregated form. Examples of the dyes having absorption maximums in the wavelength range of 500 to 550 nm as well as in the wavelength range of 560 to 620 nm are shown below.

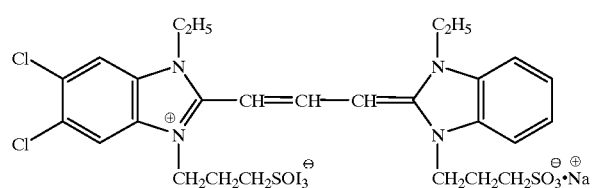

(c1)

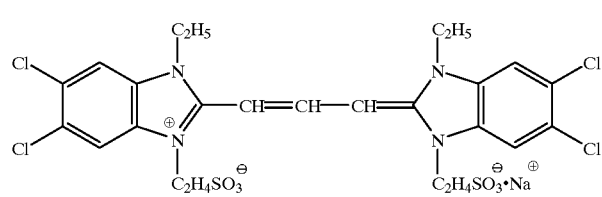

(c2)

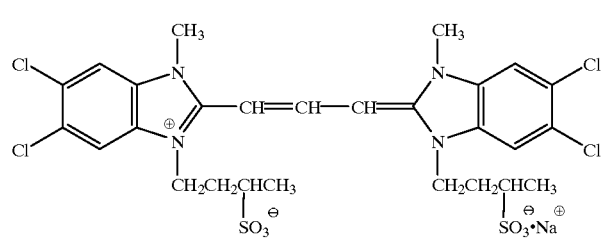

(c3)

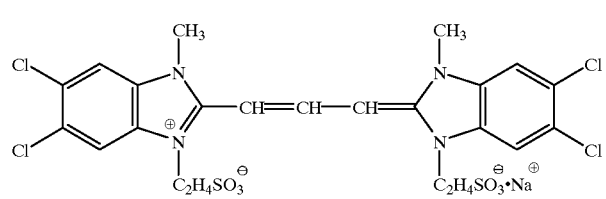

(c4)

-continued
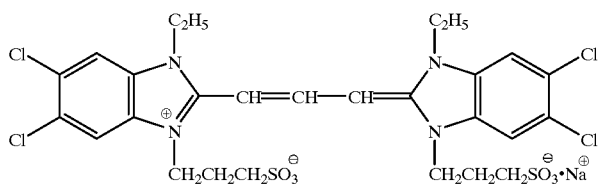
(c5)
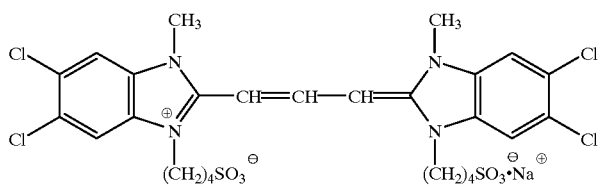
(c6)
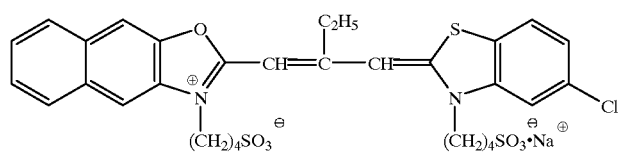
(c7)
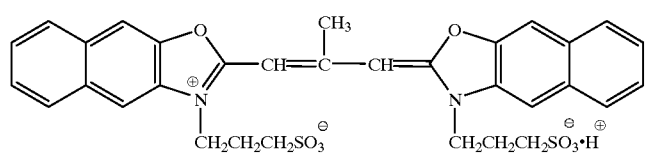
(c8)
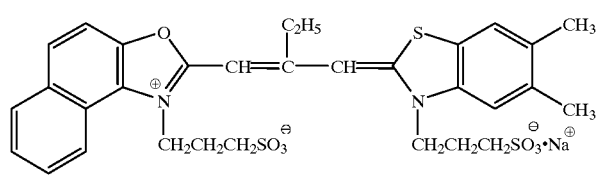
(c9)
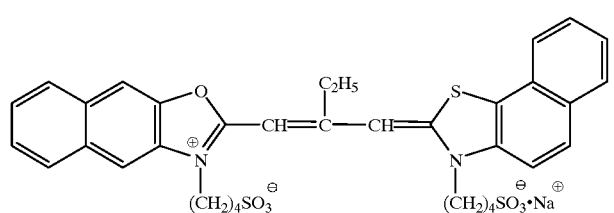
(c10)
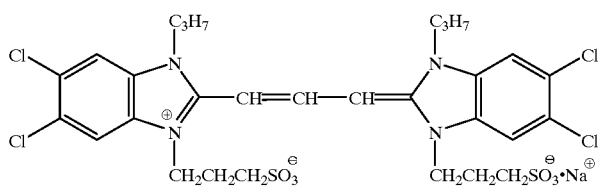
(c11)
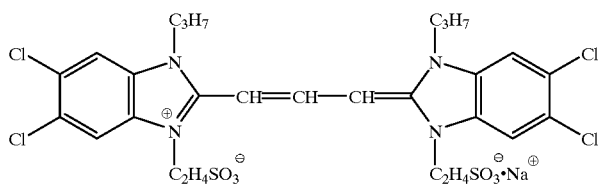
(c12)

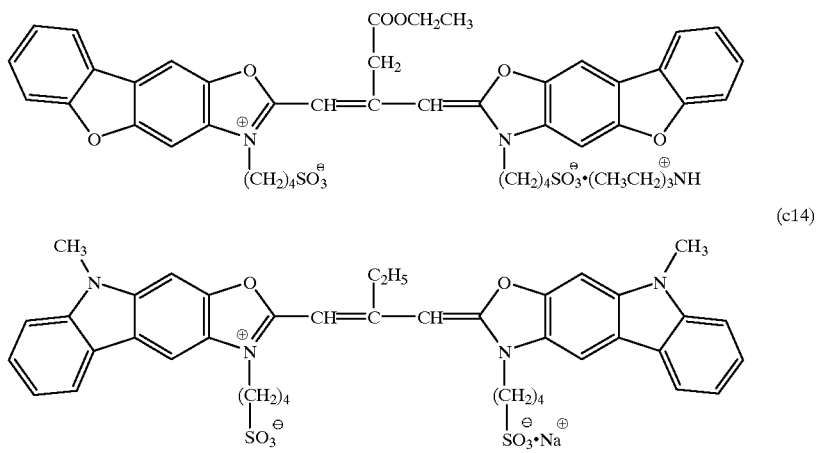

(c13)

(c14)

Further, a dye (in a non-aggregated form) having an absorption maximum in the wavelength range of 500 to 550 nm can be used in combination with another dye (in an aggregated form) having an absorption maximum in the wavelength range of 560 to 620 nm. The dye having an absorption maximum in the wavelength range of 500 to 550 nm preferably is an oxonol dye, a merocyanine dye, an arylidene dye, an azo dye, an azomethine dye or an anthraquinone dye in a non-aggregated form. The dye having an absorption maximum in the wavelength range of 560 to 620 nm preferably is a cyanine dye in an aggregated form.

The applicants have found that the combination of the dye in the aggregated form with the dye in the non-aggregated form has another effect. If the dyes are used in the combination, the light-resistance is improved, compared with each of the dyes.

The cyanine dye is defined by the following formula.

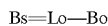

in which Bs is a basic nucleus; Bo is an onium form of a basic nucleus; and Lo is a methine chain consisting of an odd number of methines.

The cyanine dye is preferably represented by the formula (I).

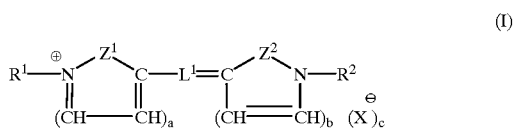

In the formula (I), each of $Z^1$ and $Z^2$ independently is a group of non-metallic atoms forming a five-membered or six-membered nitrogen-containing heterocyclic ring. The nitrogen-containing heterocyclic ring may be condensed with other heterocyclic, aromatic or aliphatic rings. Examples of the nitrogen-containing heterocyclic ring include oxazole ring, isoxazole ring, benzoxazole ring, naphthoxazole ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene or naphthalene ring. A particularly preferred ring is benzimidazole ring.

The nitrogen-containing heterocyclic ring and the ring condensed therewith can have a substituent group. Examples of the substituent groups include an alkyl group, a cycloalkyl group, an aralkyl group, an alkoxy group, an aryl group, an aryloxy group, a halogen atom (Cl, Br, F), an alkoxycarbonyl group, an alkylthio group, an arylthio group, an acyl group, an acyloxy group, amino, a substituted amino group, an amido group, a sulfonamido group, ureido, a substituted ureido group, carbamoyl, a substituted carbamoyl group, sulfamoyl, a substituted sulfamoyl group, an alkylsulfonyl group, an arylsulfonyl group, hydroxyl, cyano, nitro, sulfo, carboxyl and a heterocyclic group. Each of sulfo and carboxyl can be in the form of a salt.

The alkyl group can have a branched structure. The alkyl group preferably has 1 to 20 carbon atoms. The alkyl group can have a substituent group. Examples of the substituent groups include a halogen atom (Cl, Br, F), an alkoxy group (e.g., methoxy, ethoxy), hydroxyl and cyano. Examples of the alkyl groups (including the substituted alkyl groups) include methyl, ethyl, propyl, t-butyl, hydroxyethyl, methoxyethyl, cyanoethyl and trifluoromethyl.

Examples of the cycloalkyl groups include cyclopentyl and cyclohexyl.

The aralkyl group preferably has 7 to 20 carbon atoms. Examples of the aralkyl groups include benzyl and 2-phenethyl.

The alkoxy group can have a branched structure. The alkoxy group preferably has 1 to 12 carbon atoms. The alkoxy group can have a substituent group. Examples of the substituent groups include an alkoxy group and hydroxyl. Examples of the alkoxy groups (including the substituted alkoxy groups) include methoxy, ethoxy, methoxyethoxy and hydroxyethoxy.

The aryl group preferably is phenyl. The aryl group can have a substituent group. Examples of the substituent groups include an alkyl group, an alkoxy group, a halogen atom and nitro. Examples of the substituted aryl groups include p-tolyl, p-methoxyphenyl, o-chlorophenyl and m-nitrophenyl.

The aryloxy group preferably is phenoxy. The aryloxy group can have a substituent group. Examples of the substituent groups include an alkyl group, an alkoxy group and a halogen atom. Examples of the substituted aryloxy groups include p-chlorophenoxy, p-methylpheoxy and o-methoxyphenoxy.

The alkoxycarbonyl group preferably has 2 to 20 carbon atoms. Examples of the alkoxycarbonyl groups include methoxy carbonyl and ethoxycarbonyl.

The alkylthio group preferably has 1 to 12 carbon atoms. Examples of the alkylthio groups include methylthio, ethylthio and butylthio.

The arylthio group preferably is phenylthio. The arylthio group can have a substituent group. Examples of the substituent group include an alkyl group, an alkoxy group and carboxyl. Examples of the substituted arylthio groups include p-methylphenylthio, p-methoxyphenylthio and o-carboxyphenylthio.

The acyl group preferably has 2 to 20 carbon atoms. Examples of the acyl groups include acetyl and butyryl.

The acyloxy group preferably has 2 to 20 carbon atoms. Examples of the acyloxy groups include acetoxy and butyryloxy.

The substituted amino group preferably has 1 to 20 carbon atoms. Examples of the substituted amino groups include methylamino, anilino and triazinylamino.

The amido group preferably has 2 to 20 carbon atoms. Examples of the amido groups include acetamido, propionamido and isobutanamido.

The sulfonamido group preferably has 1 to 20 carbon atoms. Examples of the sulfonamido groups include methanesulfonamido and benzenesulfonamido.

The substituted ureido group preferably has 2 to 20 carbon atoms. Examples of the substituted ureido groups include 3-methylureido and 3,3-dimethylureido.

The substituted carbamoyl group preferably has 2 to 20 carbon atoms. Examples of the substituted carbamoyl groups include methylcarbamoyl and dimethylcarbamoyl.

The substituted sulfamoyl group preferably has 1 to 20 carbon atoms. Examples of the substituted sulfamoyl groups include dimethylsufamoyl and diethylsulfamoyl.

The alkylsulfonyl group preferably has 1 to 20 carbon atoms. Examples of the alkylsulfonyl groups include methanesulfonyl.

The arylsulfonyl group preferably is benzenesulfonyl.

Examples of the heterocyclic groups include pyridyl and thienyl.

In the formula (I), each of $R^1$ and $R^2$ independently is an alkyl group, an alkenyl group, an aralkyl group or an aryl group.

The alkyl group can have branched structure. The alkyl group preferably has 1 to 20 carbon atoms and may have a substituent group. Examples of the substituent groups include a halogen atom (Cl, Br, F), an alkoxycarbonyl group (e.g., methoxycarbonyl, ethoxycarbonyl), hydroxyl, sulfo and carboxyl. Each of sulfo and carboxyl may be in the form of a salt.

The alkenyl group preferably has 2 to 10 carbon atoms. Examples of the alkenyl group include 2-pentenyl, vinyl, allyl, 2-butenyl and 1-propenyl. The alkenyl group may have a substituent group. Examples of the substituent groups are the same as those of the alkyl group.

The aralkyl group preferably has 7 to 12 carbon atoms. Examples of the aralkyl group include benzyl and phenethyl. The aralkyl group can have a substituent group. Examples of the substituent groups include an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo, and carboxyl. Each of sulfo and carboxyl may be in the form of a salt.

Examples of the aryl group include phenyl and naphthyl. The aryl group can have a substituent group. Examples of the substituent groups are the same as those of the aralkyl group.

In the formula (I), $L^1$ is a methine chain consisting of an odd number of methines. The number is preferably 3, 5 or 7.

The methine chain can have a substituent group. In the case of that, the substituent is preferably placed at the centered methine (i.e., meso-position) of the chain. Examples of the substituent groups include an alkyl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo, and carboxyl. Two substituent groups can be combined with each other to form a five-membered or six-membered ring.

In the formula (I), each of a, b, and c independently is 0 or 1. Each of a and b is preferably 0. In the case where the cyanine dye has an anionic substituent group (e.g., sulfo, carboxyl) to form an inner salt, c is 0.

In the formula (I), X represents an anion. Examples of the anion include a halide ion (e.g., Cl$^-$, Br$^-$, I$^-$), p-toluenesulfonate ion, ethylsulfate ion, PF$_6^-$, BF$_4^-$, and ClO$_4^-$.

The cyanine dye is more preferably represented by the formula (II).

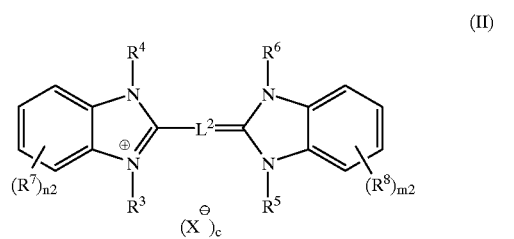

(II)

In the formula (II), each of $R^3$, $R^4$, $R^5$, and $R^6$ independently is an alkyl group, an alkenyl group, an aralkyl group or an aryl group. Examples of each group are the same as those of $R^1$ and $R^2$ in the formula (I).

In the formula (II), each of $R^7$ and $R^8$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo or carboxyl. Each of sulfo and carboxyl may be in the form of a salt.

In the formula (II), $L^2$ is a methine chain consisting of an odd number of methines. The number is preferably 3, 5 or 7 (more preferably 3). The methine chain can have a substituent group. The substituent group is preferably placed at the centered methine (i.e., meso-position) of the chain. Examples of the substituent are the same as those of the substituent groups for the methine chain in the formula (I). Two substituent groups can be combined with each other to form a five-membered or six-membered ring.

In the formula (II), each of m2 and n2 independently is an integer of 0, 1, 2, 3 or 4.

In the formula (II), X represents an anion. Examples of the anion are the same as those of X in the formula (I).

In the formula (II), c is 0 or 1.

The cyanine dye preferably has at least one water-soluble group, which means such a strongly hydrophilic group that the cyanine dye having the group is water-soluble. Examples of the water-soluble groups include sulfo, carboxyl, phosphono and a salt thereof. Examples of the counter ions for the salts include an alkali metal ion (e.g., $Na^+$, $K^+$), ammonium ion, triethylammonium ion, tributylammonium ion, pyridinium ion, tetrabutylammonium ion and an onium ion.

Examples of the cyanine dyes are shown below.

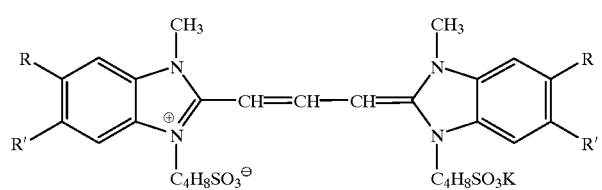

(I-1)–(I-6)

(I-1) R: Cl   R': Cl
(I-2) R: Cl   R': $CF_3$
(I-3) R: H    R': Cl
(I-4) R: H    R': $CF_3$
(I-5) R: H    R': COOH
(I-6) R: H    R': $CONH_2$

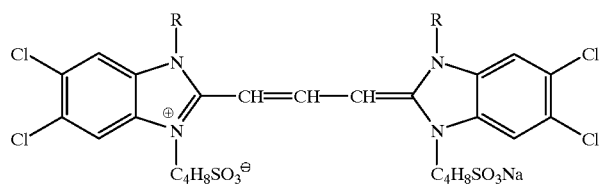

(I-7)–(I-11)

(I-7)  R: $C_2H_5$
(I-8)  R: n-$C_3H_7$
(I-9)  R: i-$C_3H_7$
(I-10) R: $C_2H_4OCH_3$
(I-11) R: $C_2H_4OH$

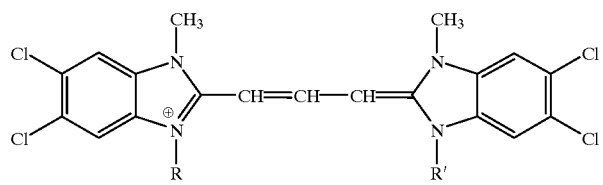

(I-12)–(I-16)

(I-12) R: $C_2H_4SO_3^-$   R': $C_2H_4SO_3K$
(I-13) R: $C_3H_6SO_3^-$   R': $C_3H_6SO_3Na$
(I-14) R: $CH_2CH_2CH(CH_3)SO_3^-$
       R': $CH_2CH_2CH(CH_3)SO_3^- \cdot (C_2H_5)_3N^+H$
(I-15) R: $C_2H_4COO^-$    R': $C_2H_4COOK$
(I-16) R: $C_4H_8SO_3^-$   R': $C_4H_8SO_3Na$

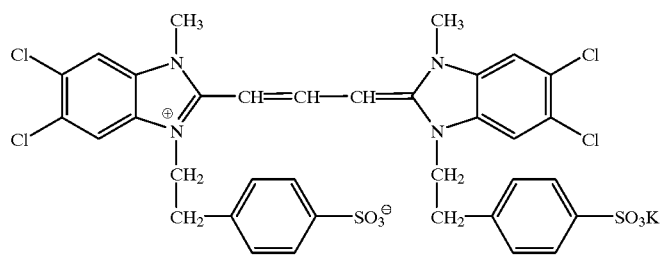

(I-17)

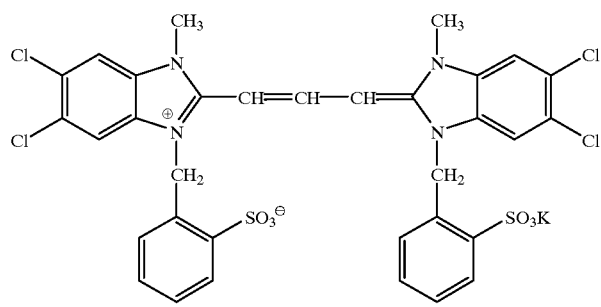
(I-18)
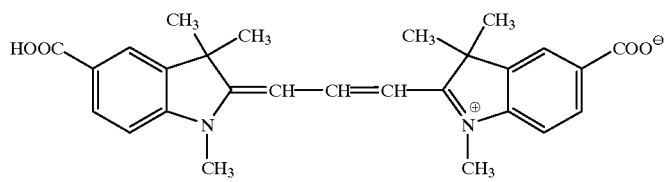
(I-19)
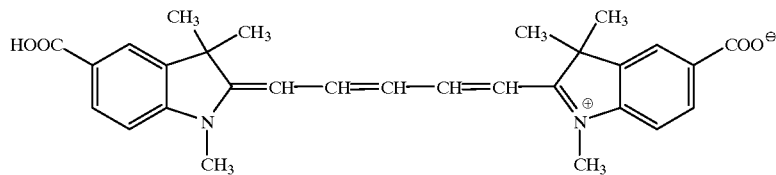
(I-20)
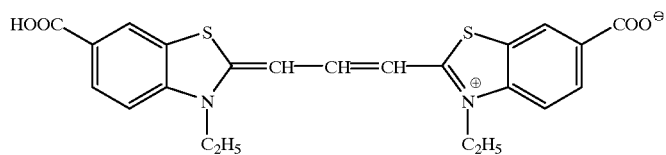
(I-21)
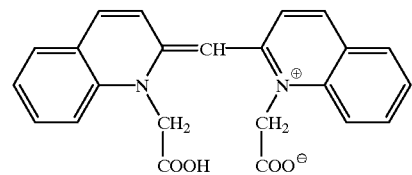
(I-22)
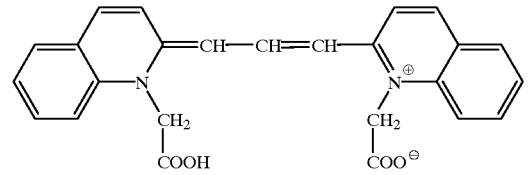
(I-23)
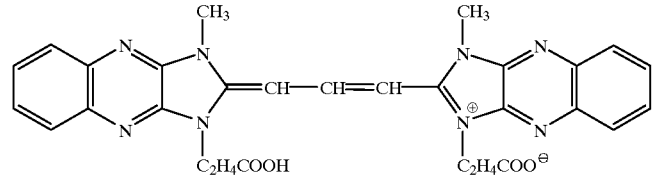
(I-24)

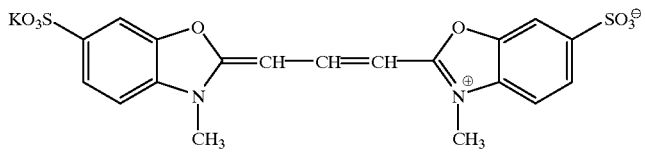

(I-25)

The cyanine dyes can be synthesized by referring to the descriptions of Japanese Patent Provisional Publication Nos. 5(1993)-88293 and 6(1994)-313939.

The oxonol dye is defined by the following formula.

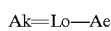

in which Ak is an acidic nucleus of a keto type; Ae is an acidic nucleus of an enol type; and Lo is a methine chain consisting of an odd number of methines.

The oxonol dye is preferably represented by the formula (III).

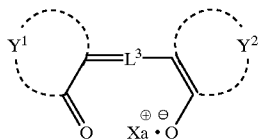
(III)

In the formula (III), each of $Y^1$ and $Y^2$ independently is a group of non-metallic atoms forming an aliphatic ring or a heterocyclic ring. The heterocyclic ring is preferred to the aliphatic ring. Examples of the aliphatic rings include indanedione ring. Examples of the heterocyclic rings include 5-pyrazolone ring, oxazolone ring, barbituric acid ring, pyridone ring, rhodanine ring, pyrazolidinedione ring and pyrazolopyridone ring. The aliphatic ring or the heterocyclic ring can have a substituent group. Examples of the substituent groups are the same as those of the substituent groups of the nitrogen-containing heterocyclic group of $Z^1$ or $Z^2$ in the formula (I).

In the formula (III), $L^3$ is a methine chain consisting of an odd number of methines. The number is preferably 3, 5 or 7 (more preferably 3). The methine chain can have a substituent group. The substituent group is preferably placed at the centered methine (i.e., meso-position) of the chain. Examples of the substituent are the same as those of the substituent groups for the methine chain in the formula (I). Two substituent groups can be combined with each other to form a five-membered or six-membered ring.

In the formula (III), Xa is proton or a cation. In the case that Xa is proton, the proton and the neighboring oxygen form hydroxyl. Examples of the cations include an alkali metal ion (e.g., $Na^+$, $K^+$), ammonium ion, triethylammonium ion, tributylammonium ion, pyridinium ion, tetrabutylammonium ion and an onium ion.

Examples of the oxonol dyes are shown below.

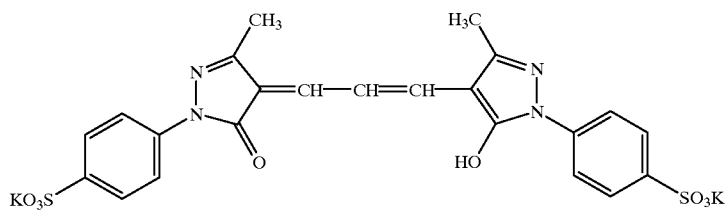
(III-1)

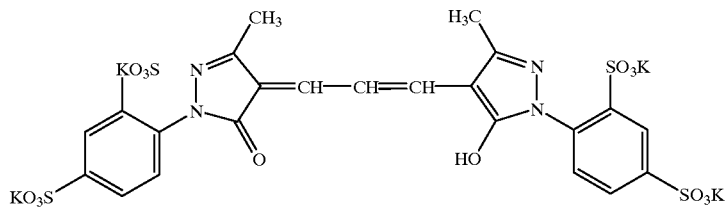
(III-2)

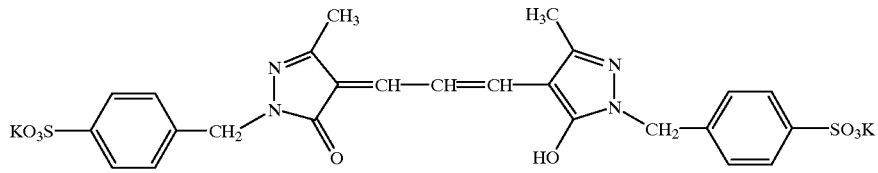
(III-3)

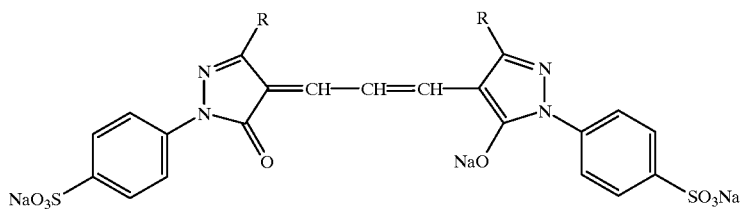
(III-4)–(III-6)
(III-4) R: t-C₄H₉
(III-5) R: NHCONHCH₃
(III-6) R: NHCOC₂H₅
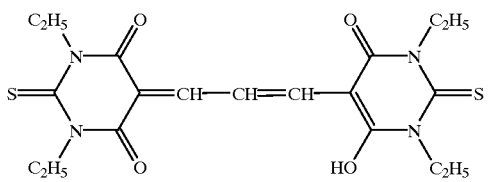
(III-7)
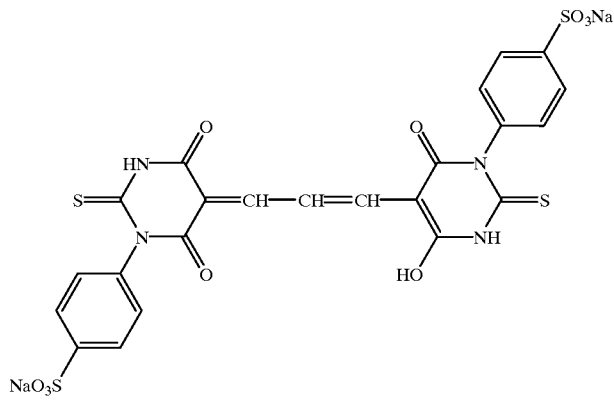
(III-8)
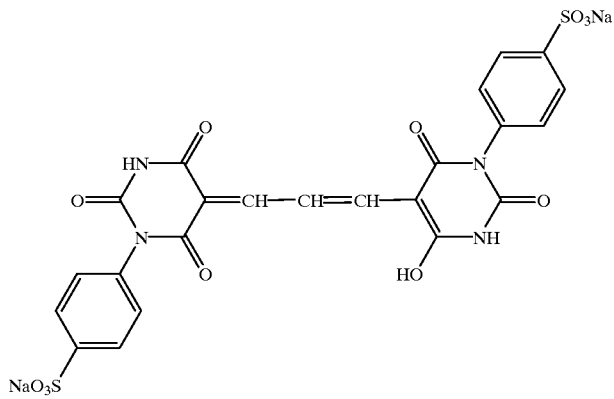
(III-9)
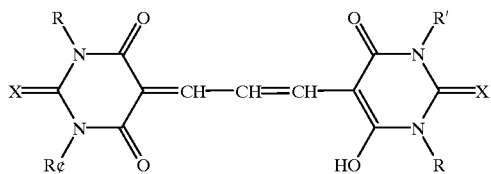
(III-10)–(III-12)
(III-10) R: C₂H₅  R¢: C₂H₄COOK  X: S
(III-11) R: C₂H₅  R': C₂H₄COOK  X: O
(III-12) R: C₂H₅  R': C₂H₄SO₃K  X: S -continued
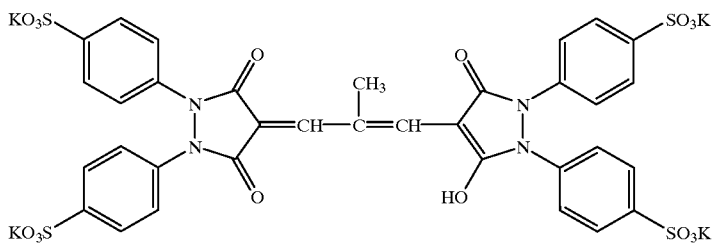
(III-13)
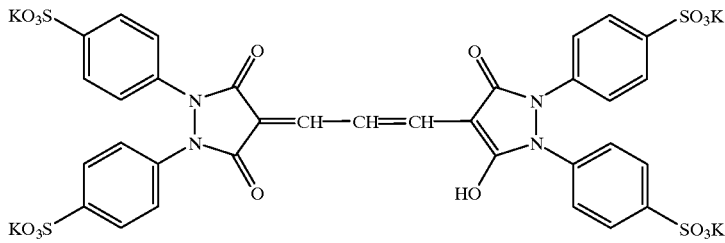
(III-14)
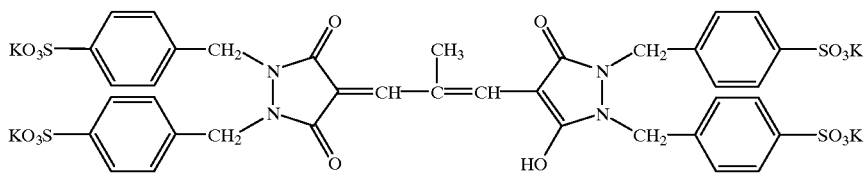
(III-15)
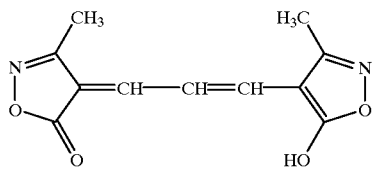
(III-16)
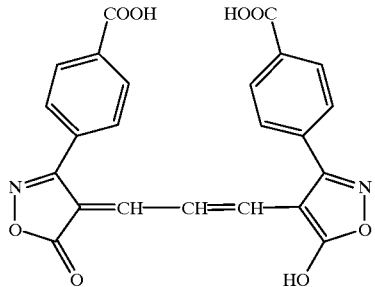
(III-17)
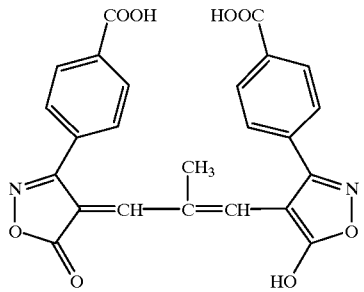
(III-18)

The oxonol dyes can be synthesized by referring to the descriptions of U.S. Pat. Nos. 2,274,782, 3,471,293 and 3,279,533.

The merocyanine dye is defined by the following formula.

in which Bs is a basic nucleus; Ak is an acidic nucleus of a keto type; and Le is a methine chain consisting of an even number of methines.

The merocyanine dye is preferably represented by the formula (IV).

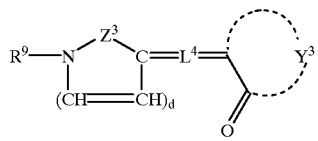

(IV)

In the formula (IV), $Z^3$ is a group of non-metallic atoms forming a five-membered or six-membered nitrogen-containing heterocyclic ring. The nitrogen-containing heterocyclic ring may be condensed with other heterocyclic, aromatic or aliphatic rings. Examples of the nitrogen-containing heterocyclic ring include oxazole ring, isoxazole ring, benzoxazole ring, naphthoxazole ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene or naphthalene ring.

The nitrogen-containing heterocyclic ring or the condensed ring thereof can have a substituent group. Examples of the substituent groups are the same as those of the substituent groups of the nitrogen-containing heterocyclic group of $Z^1$ or $Z^2$ in the formula (I).

In the formula (IV), $R^9$ is an alkyl group, an alkenyl group, an aralkyl group or an aryl group. The definitions and examples of the alkyl group, the alkenyl group, the aralkyl group and the aryl group are the same as those of $R^1$ and $R^2$ in the formula (I).

In the formula (IV), $Y^3$ is a group of non-metallic atoms forming an aliphatic ring or a heterocyclic ring. The heterocyclic ring is preferred to the aliphatic ring. Examples of the aliphatic rings include indanedione ring. Examples of the heterocyclic rings include 5-pyrazolone ring, oxazolone ring, barbituric acid ring, pyridone ring, rhodanine ring, pyrazolidinedione ring and pyrazolopyridone ring. The aliphatic ring or the heterocyclic ring can have a substituent group. Examples of the substituent groups are the same as those of the substituent groups of the nitrogen-containing heterocyclic group of $Z^1$ or $Z^2$ in the formula (I).

In the formula (IV), $L^4$ is a methine chain consisting of an even number of methines. The number is preferably 2. The methine chain can have a substituent group. Examples of the substituent are the same as those of the substituent groups for the methine chain in the formula (I).

Examples of the merocyanine dyes are shown below.

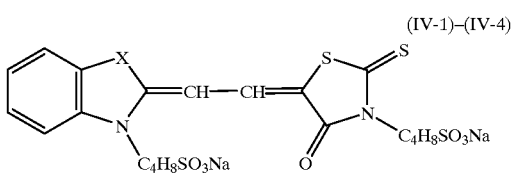

(IV-1)–(IV-4)

(IV-1)
X: —O—
(IV-2)
X: —S—
(IV-3)
X: —C(CH$_3$)$_2$—
(IV-4)
—N(CH$_3$)—

The merocyanine dyes can be synthesized by referring to the descriptions of U.S. Pat. No. 2,170,806, and Japanese Patent Provisional Publication Nos. 55(1980)-155350 and 55(1980)-161232.

The arylidene dye is defined by the following formula.

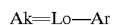

in which Ak is an acidic nucleus of a keto type; Ar is an aromatic nucleus; and Lo is a methine chain consisting of an odd number of methines.

The arylidene dye is preferably represented by the formula (V).

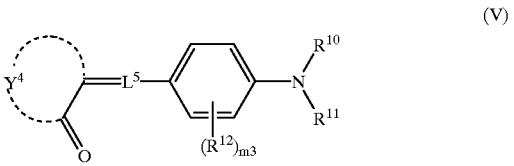

(V)

In the formula (V), $Y^4$ is a group of non-metallic atoms forming an aliphatic ring or a heterocyclic ring. The heterocyclic ring is preferred to the aliphatic ring. Examples of the aliphatic rings include indanedione ring. Examples of the heterocyclic rings include 5-pyrazolone ring, oxazolone ring, barbituric acid ring, pyridone ring, rhodanine ring, pyrazolidinedione ring and pyrazolopyridone ring. The aliphatic ring or the heterocyclic ring can have a substituent group. Examples of the substituent groups are the same as those of the substituent groups of the nitrogen-containing heterocyclic group of $Z^1$ or $Z^2$ in the formula (I).

In the formula (V), each of $R^{10}$ and $R^{11}$ independently is an alkyl group. The definitions and examples of the alkyl group are the same as those of $R^1$ and $R^2$ in the formula (I). $R^{10}$ and $R^{11}$ can be combined to form a heterocyclic ring. Examples of the heterocyclic rings include pyrrolidine ring, piperidine ring, piperazine ring and morpholine ring. $R^{10}$ or $R^{11}$ can be combined with $R^{12}$ to form a heterocyclic ring. Examples of the heterocyclic rings include julolidine ring, pyrrolidine ring and piperidine ring.

In the formula (V), $R^{12}$ is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl can be in the form of a salt.

In the formula (V), $L^5$ is a methine chain consisting of an odd number of methines. The number is preferably 1 or 3, and more preferably 1. The methine chain may have a substituent group. The methine chain preferably has no substituent group.

In the formula (V), m3 is 0, 1, 2, 3 or 4.

Example the arylidene dyes are shown below.

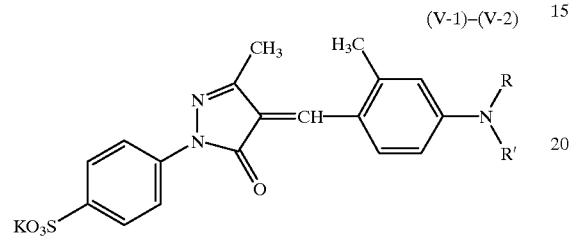

(V-1)
R: $C_2H_5$
R': $C_2H_4NHSO_2CH_3$
(V-2)
R: $C_2H_5$
R': $C_2H_5$

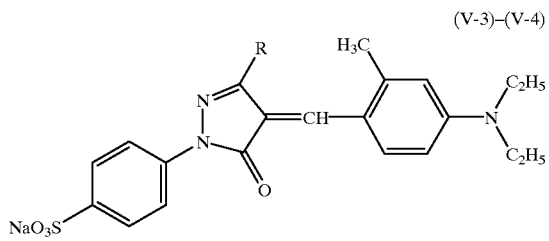

(V-3)
R: COONa
(V-4)
R: $COOC_2H_5$

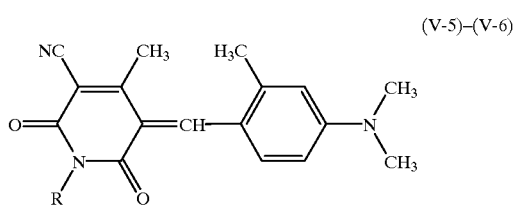

(V-3)
R: $C_2H_4COONa$
(V-4)
R: $C_2H_4SO_3Na$

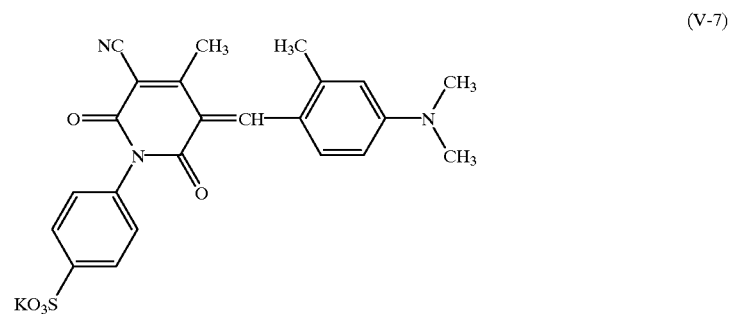

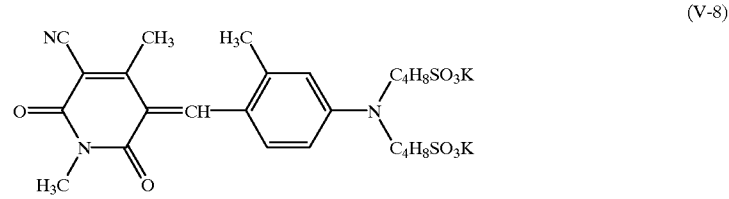

-continued
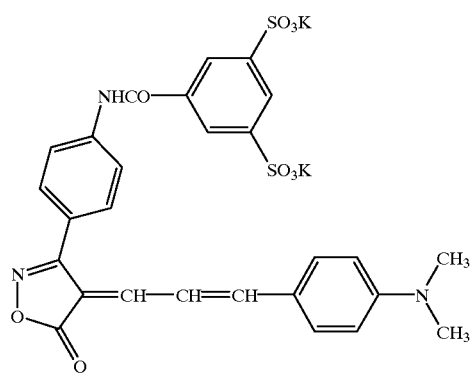
(V-9)
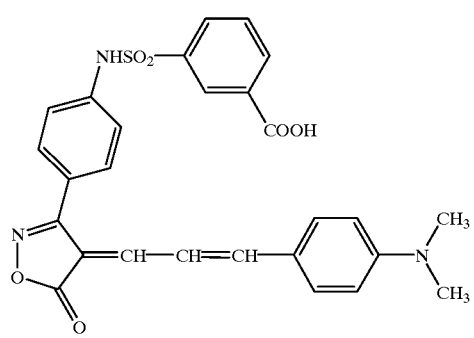
(V-10)
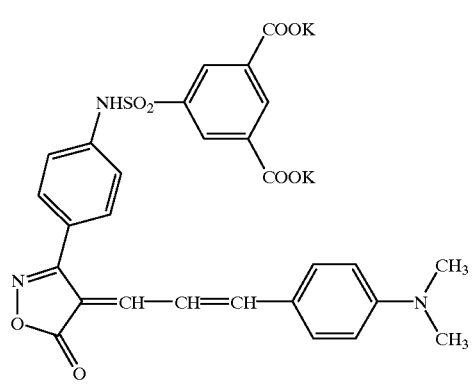
(V-11)
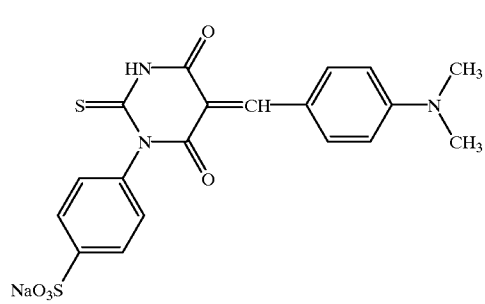
(V-12)

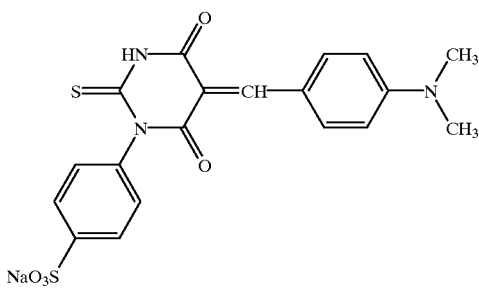
(V-12)

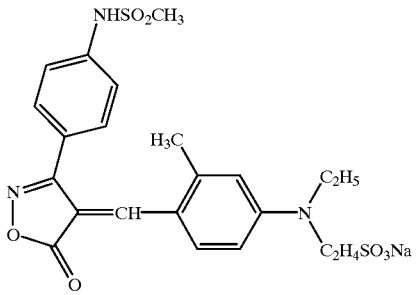
(V-13)

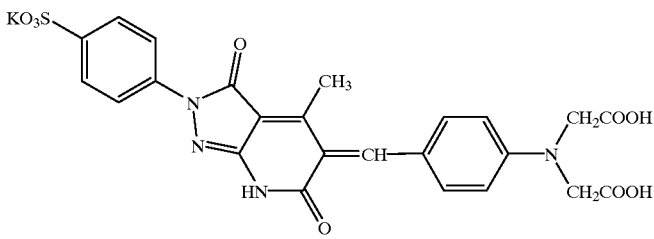
(V-14)

The arylidene dyes can be synthesized by referring to the descriptions of European Patent No. 274723A1, and Japanese Patent Provisional Publication No. 62(1987)-106455.

The azo dye is a compound having an azo structure (—N=N—) in its molecule.

The azo dye is preferably represented by the formula (VIa) or (VIb).

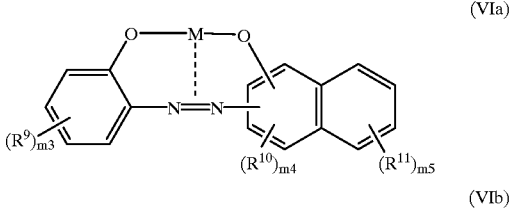
(VIa)

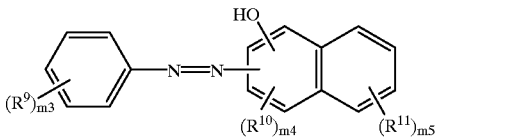
(VIb)

In the formula (VIa) or (VIb), each of $R^9$, $R^{10}$ and $R^{11}$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl can be in the form of a salt.

In the formula (VIa), M is a metal atom, preferably is a transition metal atom, more preferably is Fe, Co, Ni, Cu, Zn or Cd, and most preferably is Cu.

In the formula (VIa) or (VIb), each of m3 and m5 independently is 0, 1, 2, 3 or 4.

In the formula (VIa) or (VIb), m4 is 0, 1 or 2.

Examples of the azo dyes are shown below.

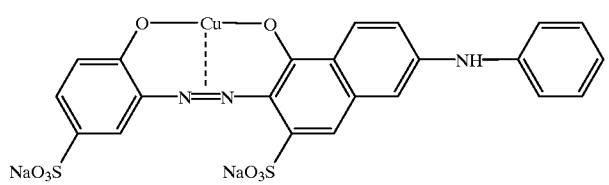
(VI-1)
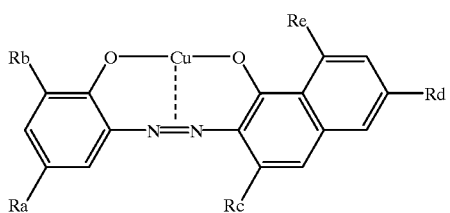
(VI-2)–(VI-5)
(VI-2)
Ra: SO₃Na
Rb: H
Rc: SO₃Na
Rd: NHCOCH₃
Re: H
(VI-3)
Ra: SO₃Na
Rb: H
Rc: SO₃Na
Rd: SO₃Na
Re: H
(VI-4)
Ra: Cl
Rb: SO₃Na
Rc: SO₃Na
Rd: SO₃Na
Re: H
(VI-5)
Ra: NO₂
Rb: NO₂
Rc: SO₃Na
Rd: SO₃Na
Re: NHCOCH₃
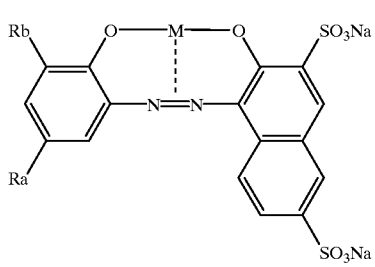
(VI-6)–(VI-11)
(VI-6)
Ra: SO₃Na
Rb: H
M: Cu
(VI-7)
Ra: Cl
Rb: SO₃Na
M: Cu
(VI-8)
Ra: NO₂
Rb: NO₂
M: Cu
(VI-9)
Ra: SO₃Na
Rb: SO₃Na
M: Co
(VI-10)
Ra: SO₃Na
Rb: SO₃Na
M: Ni
(VI-11)
Ra: SO₃Na
Rb: SO₃Na
M: Zn
(VI-21)–(VI-23)
(VI-21)
Ra: COCH₃
Rb: OH
Rc: H
(VI-22)
Ra: H
Rb: H
Rc: H
(VI-23)
Ra: COCH₃
Rb: H
Rc: CH₃

(VI-24)

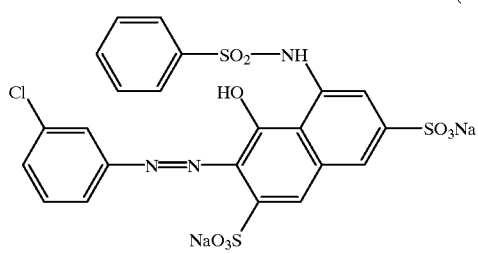

(VI-25)

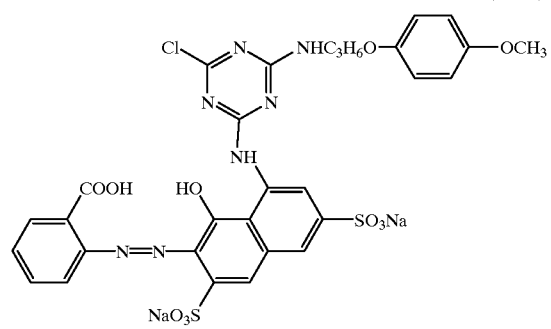

(VI-26)–(VI-27)

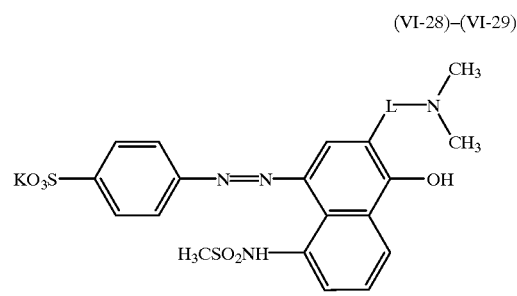

(VI-26)
Ra: SO$_3$Na
Rb: H
(VI-27)
Ra: H
Rb: SO$_3$Na (VI-28)–(VI-29)

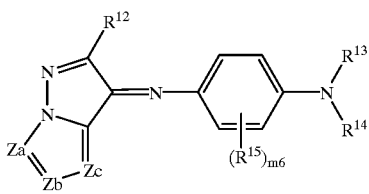

(VI-28)
L: SO$_2$
(VI-29)
L: CO

The azo dyes can be synthesized by referring to the descriptions of British Patent Nos. 539,703, 575,691, U.S. Pat. No. 2,956,879, and Hiroshi Horiguchi, "Summary of Synthesis of Dyes (written in Japanese)", Sankyo-shuppan (1968).

The azomethine dye can be classified into a basic nucleus type and an acidic nucleus type. The basic nucleus type is preferred to the acidic nucleus type.

Basic nucleus type: Bs=N—Ar
Acidic nucleus type: Ak=N—Ar
in which Bs is a basic nucleus; Ak is an acidic nucleus of a keto type; and Ar is an aromatic nucleus.

The azomethine dye is preferably represented by the formula (VII).

(VII)

$$\text{structure}$$

In the formula (VII), each of Za, Zb and Zc independently is —C(R$^{16}$)= or —N=. Each of Za and Zc preferably is —N=. Zb preferably is —C(R$^{16}$)=.

In the formula (VII), each of R$^{12}$, R$^{13}$, R$^{14}$, R$^{15}$ and R$^{16}$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl can be in the form of a salt. R$^{13}$ and R$^{14}$ can be combined to form a heterocyclic ring. Examples of the heterocyclic rings include pyrrolidine ring, piperidine ring, piperazine ring and morpholine ring. R$^{13}$ or R$^{14}$ can be combined with R$^{15}$ to form a heterocyclic ring. Examples of the heterocyclic rings include julolidine ring, pyrrolidine ring and piperidine ring.

In the formula (VII), m6 is 0, 1, 2, 3 or 4.

Examples of the azomethine dyes are shown below.

(VII-1)–(VII-3)

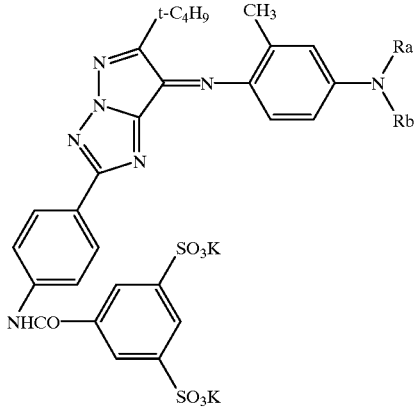

(VII-1)
Ra: C$_2$H$_5$
Rb: C$_2$H$_5$
(VII-2)
Ra: C$_2$H$_4$CN
Rb: C$_2$H$_4$CN
(VII-3)
Ra: C$_2$H$_5$
Rb: C$_4$H$_8$SO$_3$K

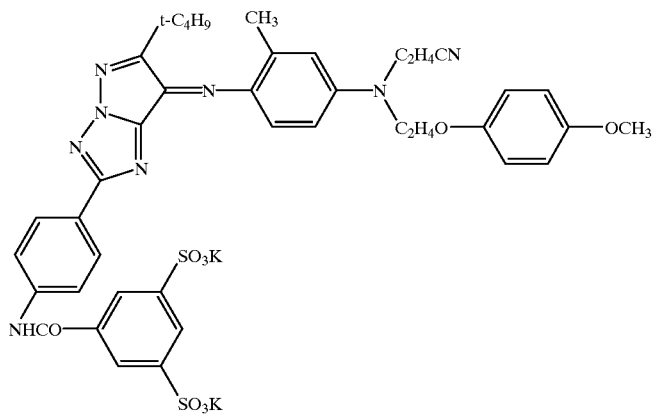
(VII-4)
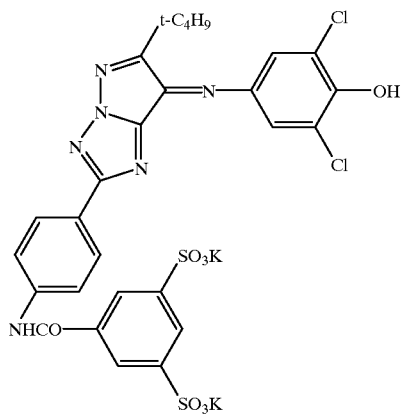
(VII-5)
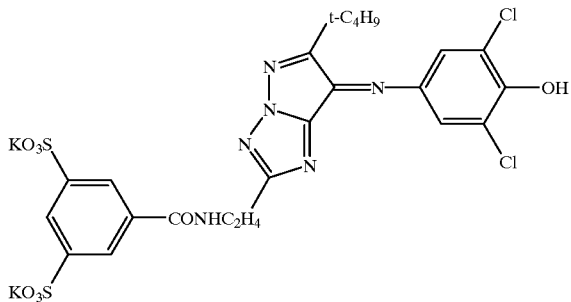
(VII-6)
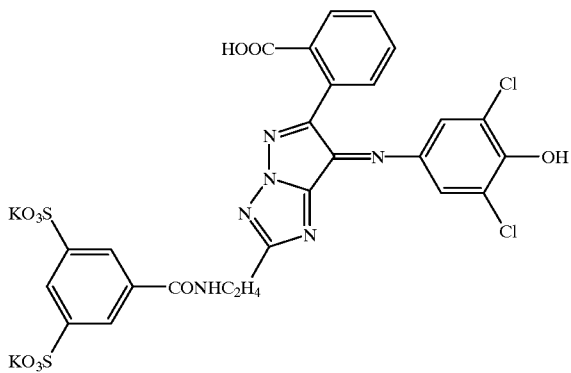
(VII-7)

(VII-8)

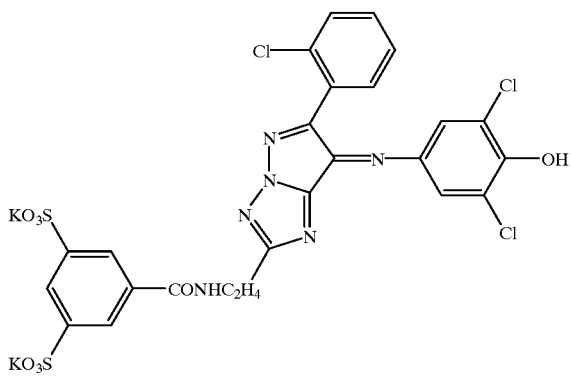

(VII-9)

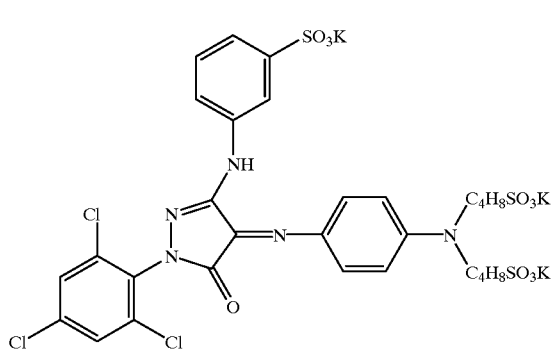

(VII-10)

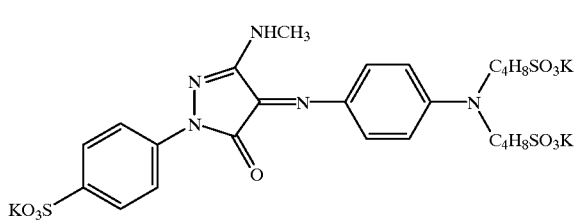

The azomethine dyes can be synthesized by referring to the descriptions of Japanese Patent Provisional Publication Nos. 62(1987)-3250, 4(1992)-178646, 5(1993)-323501.

The anthraquinone dye is preferably represented by the formula (VIIIa) or (VIIIb).

(VIIIa)

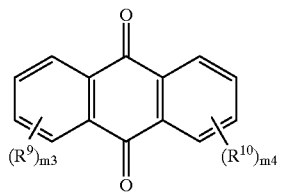

(VIIIb)

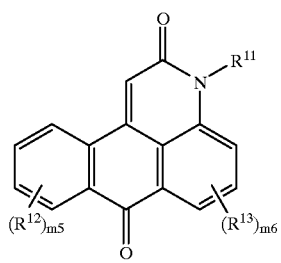

In the formula (VIIIa) or (VIIIb), each of $R^9$, $R^{10}$, $R^{12}$ and $R^{13}$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl can be in the form of a salt.

In the formula (VIIIb), $R^{11}$ is hydrogen or an alkyl group. The alkyl group can have a branched structure. The alkyl group preferably has 1 to 20 carbon atoms. The alkyl group can have a substituent group. Examples of the substituent groups include a halogen atom (Cl, Br, F), an alkoxycarbonyl group (e.g., methoxycarbonyl, ethoxycarbonyl), hydroxyl, sulfo and carboxyl. Each of sulfo and carboxyl can be in the form of a salt.

In the formula (VIIIa) and (VIIIb), each of m3, m4 and m5 independently is 0, 1, 2, 3 or 4.

In the formula (VIIIb), m6 is 0, 1, 2 or 3.

Examples of the anthraquinone dyes are shown below.

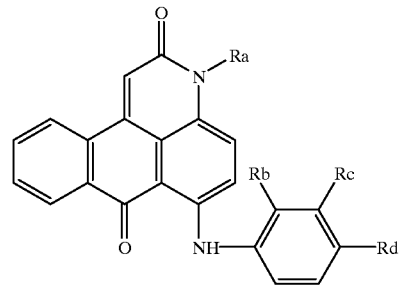

(VIII-1)–(VIII-8)

(VIII-1)
Ra: CH$_3$
Rb: SO$_3$K
Rc: H
Rd: SO$_3$K
(VIII-2)
Ra: C$_2$H$_5$
Rb: SO$_3$K
Rc: H
Rd: SO$_3$K
(VIII-3)
Ra: C$_2$H$_4$SO$_3$K
Rb: SO$_3$K
Rc: H
Rd: SO$_3$K
(VIII-4)
Ra: CH$_2$COOK
Rb: SO$_3$K
Rc: H
Rd: SO$_3$K
(VIII-5)
Ra: CH$_3$
Rb: H
Rc: H
Rd: SO$_3$K
Rd: CH$_3$
(VIII-6)
Ra: CH$_3$
Rb: SO$_3$Na
Rc: H
Rd: CH$_3$
(VIII-7)
Ra: CH$_3$
Rb: H
Rc: Cl
Rd: SO$_3$Na
(VIII-8)
Ra: CH$_3$
Rb: CH$_3$
Rc: H

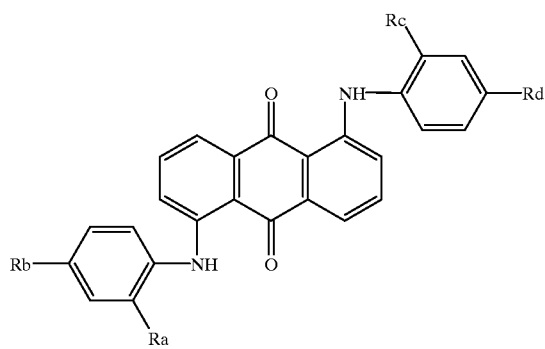

(VIII-9)–(VIII-12)

(VIII-9)
Ra: H
Rb: SO$_3$K
Rc: H
Rd: SO$_3$K
(VIII-10)
Ra: CH$_3$
Rb: SO$_3$K
Rc: CH$_3$
Rd: SO$_3$K
(VIII-11)
Ra: SO$_3$Na
Rb: SO$_3$Na
Rc: SO$_3$Na
Rd: SO$_3$Na
(VIII-12)
Ra: CH$_3$
Rb: H
Rc: CH$_3$
Rd: H

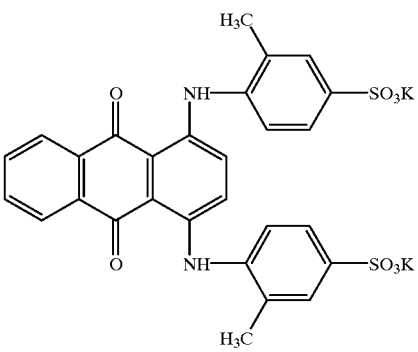

(VIII-13)

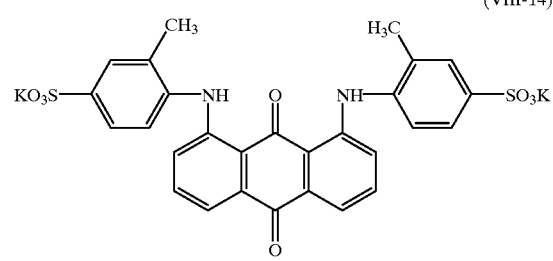

(VIII-14)

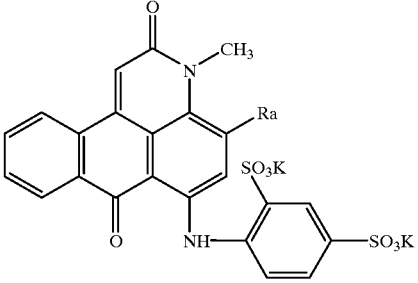

(VIII-15)–(VIII-16)

(VIII-15)
Ra: Cl
(VIII-16)
Ra: SO$_3$K

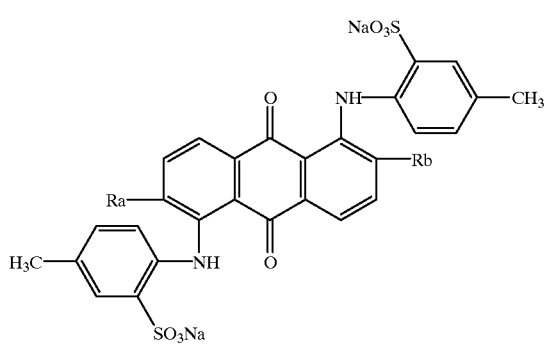

(VIII-17)–(VIII-18)

(VIII-17)
Ra: Cl
Rb: Cl
(VIII-16)
Ra: SO₃Na
Rb: SO₃Na (VIII-19)

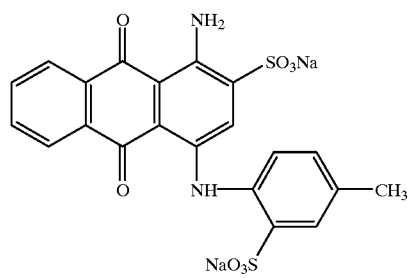

The anthraquinone dyes can be synthesized by referring to the descriptions of British Patent No. 710,060, U.S. Pat. No. 3,575,704, Japanese Patent Provisional Publication No. 48(1973)-5425, and Hiroshi Horiguchi, "Summary of Synthesis of Dyes (written in Japanese)", Sankyo-shuppan (1968).

The filter layer can further contain another dye. For example, the filter dye can contain a near infrared absorbing dye. Examples of the near infrared absorbing dyes include cyanine dyes (described in Japanese Patent Provisional Publication No. 9(1997)-96891), metal chelate dyes, aminium dyes, diimmonium dyes, quinone dyes, squarylium dyes (described in Japanese Patent Provisional publication Nos. 9(1997)-90547, 10(1998)-204310) and various methine dyes. The near infrared absorbing dyes are also described in "Shikizai (Coloring material)", 61[4] 215–226 (1988), and "Kagaku-Kogyo (Chemical Industry)", May (1986), 43–53. Further, the filter layer can contain another visible light absorbing dye, such as triphenylmethane dye (described in U.S. Pat. No. 2,150,695 and Japanese Patent Provisional Publication No. 5(1993)-117536) and fluorescein dye (e.g., fluorescein, dibromofluorescein, eosin, Rhodamine).

Examples of the other dyes are shown below.

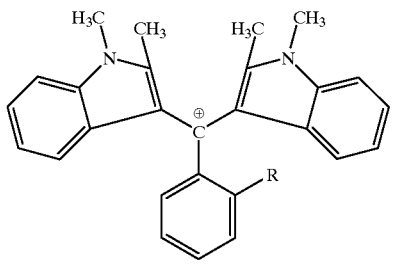

(IX-1)–(IX-2)

(IX-1)
R: SO₃⁻
(IX-2)
R: CO₂⁻

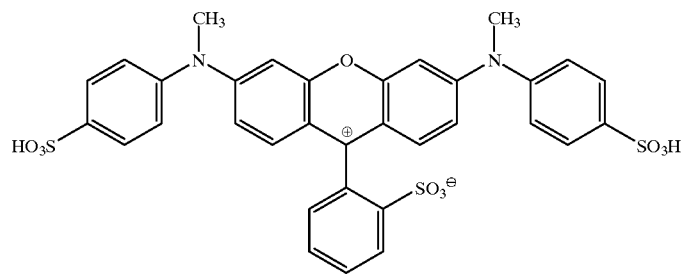

(IX-3)

-continued

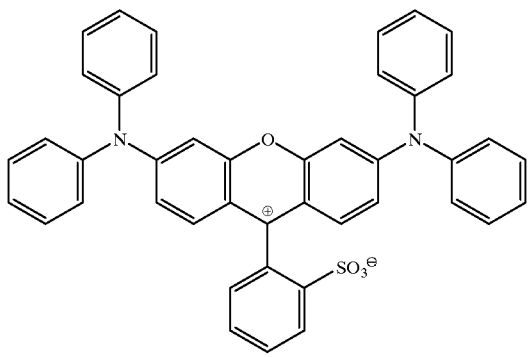
(IX-4)

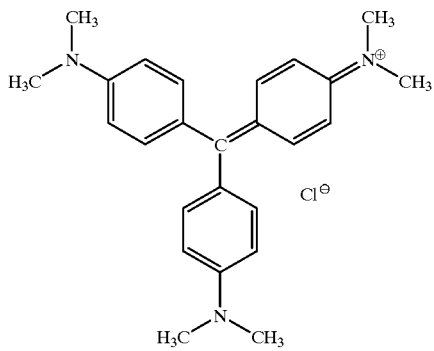
(IX-5)

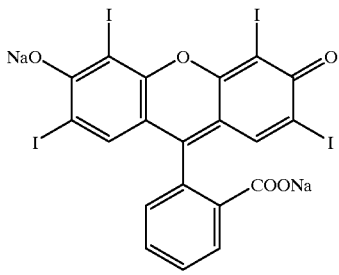
(IX-6)

The cyanine dye is preferably used in an aggregated form for the absorption maximum in the wavelength range of 560 to 620 nm. The other dyes are preferably used in a non-aggregated form for the absorption maximum in the wavelength range of 500 to 550 nm.

A dye in an aggregated form usually has a J-band and a sharp absorption peak in its spectrum. The aggregated form of the dye in the aggregated form and the J-band are described in Photographic Science and Engineering Vol. 18, No. 323–335 (1974).

Further, the absorption maximum of a dye can be shifted to a long wavelength region by changing the non-aggregated form to the aggregated form. Therefore, it can be determined by measuring an absorption maximum whether a dye contained in a filter layer is in an aggregated form or not.

In the present specification, the aggregated form means that the wavelength of the absorption maximum of the aggregated form is longer than the wavelength of the absorption maximum of the same dye in a solution, and the difference between the absorption maximums is larger than 30 nm. The non-aggregated form means that the difference between the absorption maximums is not larger than 30 nm. With respect to the aggregated form, the difference between the absorption maximums is preferably larger than 40 nm, more preferably larger than 45 nm, and most preferably larger than 50 nm. With respect to the non-aggregated form, the difference between the absorption maximums is preferably not larger than 25 nm, more preferably not larger than 20 nm, and most preferably not larger than 15 nm.

Some dyes can be in an aggregated form merely by dissolving the dyes in water. The aggregated form is usually obtained by adding gelatin or salt (e.g., barium chloride, ammonium chloride, sodium chloride) to an aqueous solution of a dye. The aggregated form is preferably obtained by adding gelatin to an aqueous solution of a dye.

The aggregated form can also be obtained as a solid fine particle dispersion. The fine particles can be prepared by means of known mills. Examples of the mill include a ball mill, a vibrating mill, a planetary ball mill, a sand mill, a colloid mill, a jet mill and a roller mill. A vertical or horizontal dispersing machine (described in Japanese Patent Provisional Publication No. 52(1977)-92716 and International Pat. No. 88/074794) is preferred.

The dispersing process can be carried out in the presence of an appropriate medium (e.g., water, alcohol). In that case, it is preferred to use a dispersing surface active agent. As the surface active agent, an anionic surface active agent (described in Japanese Patent Provisional Publication No. 52(1977)-92716 and International Pat. No. 88/074794) is preferably used. If necessary, an anionic polymer or a nonionic or cationic surface active agent may be used.

The powdery fine particles of the dye can be prepared by the steps of dissolving the dye in an appropriate solvent and adding a bad solvent to precipitate the particles. In that case, the aforementioned surface active agents are also employable. The fine particles can also be precipitated by adjusting the pH value. The obtained fine particles are also in the aggregated form.

A dye in a non-aggregated form can be obtained by dissolving the dye in a solvent and adding the solution to a coating solution of the filter layer.

The amount of the dye in an aggregated form is preferably in the range of 1 to 99 wt. %, more preferably in the range of 2 to 98 wt. %, and most preferably in the range of 3 to 97 wt. %, based on the total amount of the dyes contained in the filter layer.

The aggregated form can easily be obtained by using a cyanine dye, compared with other dyes. When the cyanine dye and another dye are added to a medium or a gelatin solution, the cyanine dye is usually in the aggregated form while another dye is usually in the non-aggregated form.

The filter layer preferably further contains a binder polymer. Examples of the polymer include natural polymers (e.g., gelatin, cellulose derivatives, alginic acid), and synthesized polymers (e.g., polymethyl methacrylate, polyvinyl butyral, polyvinyl pyrrolidone, polyvinyl alcohol, polyvinyl chloride, styrene-butadiene copolymer, polystyrene, polycarbonate, water-soluble polyimide). Particularly preferred polymers are hydrophilic ones (e.g., the aforementioned natural polymers, polyvinyl butyral, polyvinyl pyrrolidone, polyvinyl alcohol, water-soluble polyimide).

The filter layer can contain an anti-fading agent, which stabilizes the dye. Examples of the anti-fading agent include hydroquinone derivatives (described in U.S. Pat. Nos. 3,935,016 and 3,982,944), hydroquinone diether derivatives (described in U.S. Pat. No. 4,254,216 and Japanese Patent Provisional Publication No. 55(1980)-21004), phenol derivatives (described in Japanese Patent Provisional Publication No. 54(1979)-145530), spiroindane or methylenedioxybenzene derivatives (described in British Patent Publication Nos. 2,077,455, 2,062,888 and Japanese Patent Provisional Publication No. 61(1986)-90155), chroman, spirochroman or coumaran derivatives (described in U.S. Pat. Nos. 3,432,300, 3,573,050, 3,574,627, 3,764,337 and Japanese Patent Provisional Publication Nos. 52(1977)-152225, 53(1978)-20327, 53(1978)-17729, and 61(1986)-90156), hydroquinone monoether or p-aminophenol derivatives (described in British Patent Publication Nos. 1,347,556, 2,066,975, Japanese Patent Publication No. 54(1979)-12337, and Japanese Patent Provisional Publication No. 55(1980)-6321), and bisphenol derivatives (described in U.S. Pat. No. 3,700,455, and Japanese Patent Publication No. 48(1973)-31625).

As the anti-fading agent, metal complexes (described in U.S. Pat. No. 4,245,018 and Japanese Patent Provisional Publication No. 60(1985)-97353) can be used to improve the stability of the dye against light or heat.

Further, a singlet oxygen quencher is also usable as the anti-fading agent for improving the light resistance of the dye. Examples of the singlet oxygen quencher include nitroso compounds (described in Japanese Patent Provisional Publication No. 2(1990)-300288), diimmonium compounds (described in U.S. Pat. No. 465,612), nickel complexes (described in Japanese Patent Provisional Publication No. 4(1992)-146189), and anti-oxidizing agents (described in European Patent Publication No. 820057A).

Anti-Reflection Layers

The optical filter can have an anti-reflection layer. The optical filter having the anti-reflection layer serves as an anti-reflection film. As the anti-reflection layer, a low refractive index layer is essential. The refractive index of the low refractive index layer is lower than that of the support, preferably in the range of 1.20 to 1.55, and more preferably in the range of 1.30 to 1.55.

The low refractive index layer preferably has a thickness of 50 to 400 nm, and more preferably of 50 to 200 nm.

Various kinds of low refractive index layer have been proposed, and are employable for the invention. Examples of them include a layer comprising fluorine-contained polymer of low refractive index (disclosed in Japanese Patent Provisional Publication Nos. 57(1982)-34526, 3(1991)-130103, 6(1994)-115023, 8(1996)-313702, and 7(1995)-168004), a layer formed by sol-gel method (disclosed in Japanese Patent Provisional Publication Nos. 5(1993)-208811, 6(1994)-299091, and 7(1995)-168003), and a layer containing fine particles (disclosed in Japanese Patent Publication No. 60(1985)-59250, and Japanese Patent Provisional Publication Nos. 5(1993)-13021, 6(1994)-56478, 7(1995)-92306, and 9(1997)-288201). The low refractive index layer containing fine particles may further contain micro voids among the particles. The void ratio in the low refractive index layer is preferably in the range of 3 to 50 vol. %, and more preferably 5 to 35 vol. %.

In addition to the low refractive index layer, layers having higher refractive indexes (i.e., middle and high refractive index layers) are preferably provided to reduce the reflection in a wide wavelength region.

The high refractive index layer preferably has a refractive index of 1.65 to 2.40, and more preferably 1.70 to 2.20. The middle refractive index layer has a refractive index between those of the low and high refractive index layers. The refractive index of the middle refractive index layer is preferably in the range of 1.50 to 1.90, and more preferably in the range of 1.55 to 1.70.

Each of the middle and high refractive index layers preferably has a thickness of 5 nm to 100 μm, more preferably 10 nm to 10 μm, and most preferably 30 nm to 1 μm.

The haze of each layer is preferably in the range of not more than 5%, more preferably not more than 3%, further preferably not more than 1%.

The middle and high refractive index layers can be formed from a binder polymer having a relatively high refractive index. Examples of that binder polymer include polystyrene, styrene copolymer, polycarbonate, melamine resin, phenol resin, epoxy resin, and a polyurethane derived from the reaction between cyclic (alicyclic or aromatic) isocyanate and polyol. Further, other polymers having cyclic (aromatic, heterocyclic or alicyclic) groups and polymers substituted with a halogen atom except fluorine also have high refractive indexes. The polymer may be prepared by polymerization of monomers having double bonds for radical hardening.

For a higher refractive index, inorganic fine particles may be dispersed in the binder polymers. The inorganic fine particles preferably have a refractive index of 1.80 to 2.80. As the materials for the particles, metal oxides and sulfides are preferred. Examples of them include titanium dioxide (rutile, mixed crystal of rutile/anatase, anatase, amorphous structure), tin oxide, indium oxide, zinc oxide, zirconium oxide, and zinc sulfide. Preferred materials are titanium oxide, tin oxide, and zirconium oxide. The inorganic fine particles may contain other elements, as well as those oxides or sulfides of main component. The "main component" here means the component contained in the largest content (wt. %). Examples of the other elements include Ti, Zr, Sn, Sb, Cu, Fe, Mn, Pb, Cd, As, Cr, Hg, Zn, Al, Mg, Si, P, and S.

The middle and high refractive index layers can be formed from liquid or soluble film-formable inorganic materials. Examples of the materials include alkoxides of various elements, salts of organic acids, coordination compounds (e.g., chelate compounds), and active inorganic polymers.

The surface of the anti-reflection layer (i.e., the low refractive index layer) can be made to show anti-glare performance (which prevents the surface from reflecting the surrounding scene by scattering the incident light). For example, the anti-reflection layer may be formed on a finely roughened surface of a transparent film. Otherwise, the surface of the anti-reflection layer may be roughened by means of an embossing roll. The haze of the anti-reflection layer having such surface is generally in the range of 3 to 30%.

Other Layers

The optical filter can further comprise a hard coating layer, a slippery layer, an antistatic layer or an intermediate layer.

The hard coating layer preferably contains a cross-linked polymer, and can be formed from acrylic, urethane or epoxy polymer or oligomer (e.g., UV curable resin) or silica material.

On the top surface of the optical filter, a slippery layer may be provided. The slippery layer gives slipperiness to the surface of the optical filter, and improves the scratch resistance of the filter. The slippery layer can be formed from polyorganosiloxane (e.g., silicone oil), a natural wax, a petroleum wax, a metal salt of higher fatty acid, a fluorine lubricant or its derivative. The thickness of the slippery layer is preferably in the range of 2 to 20 nm.

The layers such as the anti-reflection layers (middle, high, and low refractive index layers), the filter layer, the undercoating layer, the hard coating layer, the slippery layer, and other layers can be formed by known coating methods. Examples of the coating method include dip coating, air knife coating, curtain coating, roller coating, wired bar coating, gravure coating, and extrusion coating with a hopper (described in U.S. Pat. No. 2,681,294). Two or more layers may be simultaneously formed by coating. The method for simultaneous coating is described in U.S. Pat. Nos. 2,761,791, 2,941,898, 3,508,947, and 3,526,528; and "Coating Engineering" pp. 253, written by Y. Harazaki, published by Asakura Shoten (1973).

Use of Optical Filter

The optical filter of the invention can be applied on a display device such as a liquid crystal display (LCD), a plasma display panel (PDP), an electroluminescence display (ELD) or a cathode ray tube display (CRT). In the case that the optical filter has an anti-reflection layer, the optical filter is so arranged on the device that the surface opposite to the low refractive index layer is attached to the display surface. The optical filter of the invention is particularly effective in a plasma display panel (PDP).

A plasma display panel (PDP) comprises gas, glass substrates (front and back glass substrates), electrodes, electrode-lead member, thick film printing member, and phosphor. Each of the glass substrates is equipped with the electrode and an insulating layer. On the back glass substrate, a phosphor layer is further provided. The gas is enclosed between the substrates.

A plasma display panel (PDP) is commercially available, and is described in Japanese Patent Provisional Publication Nos. 5(1993)-205643 and 9(1997)-306366.

In the display device such as the plasma display panel, the display surface is covered with the optical filter. The optical filter can be directly attached on the display surface. In the case that a plate is arranged in front of the display surface, the optical filter can be attached to the front (outside) surface of the front plate or the back (display side) surface of the plate.

EXAMPLE 1

Formation of Undercoating Layer

Both surfaces of a transparent polyethylene terephthalate film (thickness: 100 µm) were subjected to a corona discharge treatment. A latex of styrene-butadiene copolymer was applied on one surface to form an undercoating layer of 130 nm thickness.

Formation of Second Undercoating Layer

On the undercoating layer, an aqueous solution of gelatin containing acetic acid and glutaric aldehyde was applied to form a second undercoating layer of 50 nm thickness.

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size: 1 µm) to prepare a coating solution for the low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Formation of Filter Layer

In 180 g of 10 wt. % aqueous solution of gelatin, 0.05 g of the dye (b4) and 0.05 g of the dye (a1) were dissolved. The solution was stirred at 40° C. for 30 minutes, and then filtered through a polypropylene filter (porosity size: 2 µm) to prepare a coating solution for the filter layer. The coating solution was coated on the second undercoating layer, and dried at 120° C. for 10 minutes to form a filter layer (dry thickness: 3.5 µm).

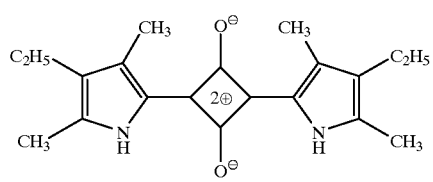

(b4)

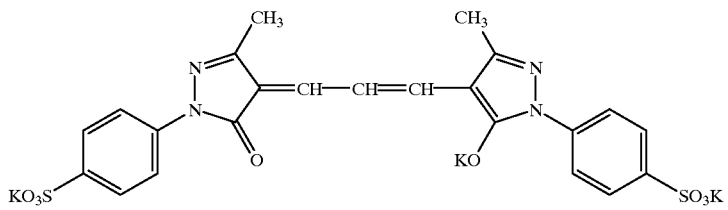

The absorption spectrum of the obtained optical filter was measured. The filter layer has two absorption maximums at 530 nm and 594 nm. The transmittance at 530 nm was 70%, and the transmittance at 594 nm was 30%. The half-width of the absorption maximum at 530 nm was 110 nm, and the half-width of the absorption maximum at 594 nm was 35 nm.

EXAMPLE 2

Formation of Undercoating Layer

On one surface of a transparent cellulose triacetate film (thickness: 80 μm), a gelatin dispersion in methanol and acetone was coated, and dried to form an undercoating layer (thickness: 200 nm).

Formation of Hard Coating Layer

In 50 weight parts of methyl ethyl ketone, 25 weight parts of dipentaerythrytol hexaacrylate (DPHA, Nippon Kayaku Co., Ltd.), 25 weight parts of urethane acrylate oligomer (UV-6300B, Nippon Synthetic Chemical Industry Co., Ltd.), 2 weight parts of a photopolymerization initiator (Irgacure 907, Ciba-Geigy) and 0.5 weight part of a photosensitizer (Kayacure DETX, Nippon Kayaku Co., Ltd.) were dissolved to prepare a coating solution for the hard coating layer. The coating solution was applied on the support surface opposite to the undercoating layer by using a wired bar coater. The formed layer was dried, and irradiated with ultraviolet ray to form a hard coating layer (thickness: 6 μm).

Formation of Low Refractive Index Layer

A low refractive index layer was formed on the hard coating layer in the same manner as in Example 1 by using the coating solution containing the reactive fluorocarbon polymer.

Formation of Filter Layer

In 180 g of 10 wt. % aqueous solution of gelatin, 0.05 g of the dye (c1) was dissolved. The solution was stirred at 40° C. for 30 minutes, and then filtered through a polypropylene filter (porosity size: 2 μm) to prepare a coating solution for the filter layer. The coating solution was coated on the undercoating layer, and dried at 120° C. for 10 minutes to form a filter layer (dry thickness: 3.5 μm).

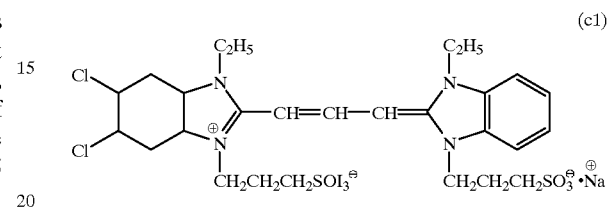

Figure 3:
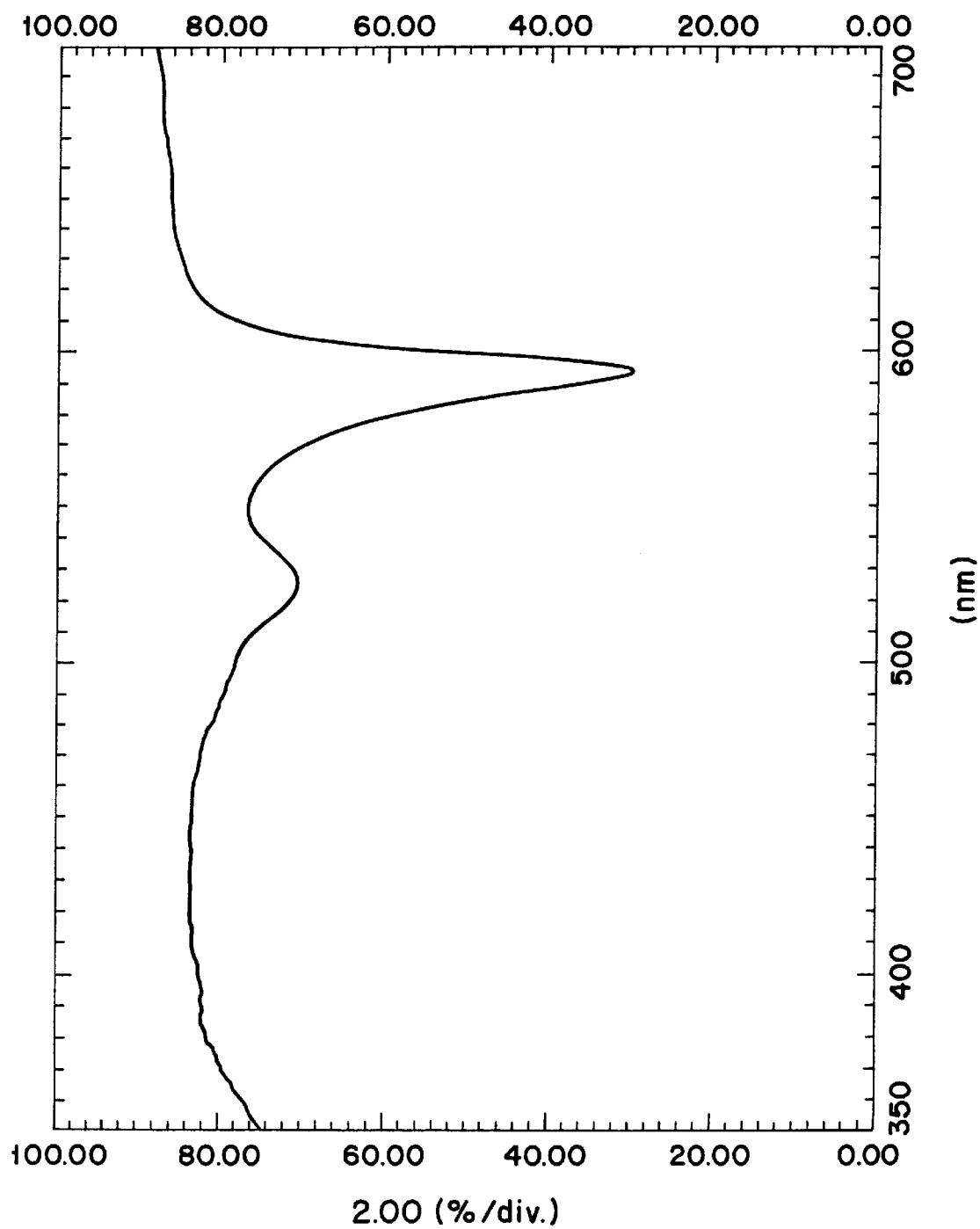
FIG. 3 is a graph showing the spectral transmittance of the optical filter prepared in Example 2.

The absorption spectrum of the obtained optical filter was measured. The results are set forth in FIG. 3, which is a graph showing the spectral transmittance of the prepared optical filter.

As is shown in FIG. 2, the filter layer has two absorption maximums at 527 nm and 596 nm. The transmittance at 527 nm was 80%, and the transmittance at 596 nm was 25%. The half-width of the absorption maximum at 527 nm was 90 nm, and the half-width of the absorption maximum at 596 nm was 30 nm.

EXAMPLE 3

Formation of Undercoating Layers

An undercoating layer (a) and a second undercoating layer (a) were formed on one surface of a transparent polyethylene terephthalate film (thickness: 100 μm) in the same manner as in Example 1.

On the other surface of the transparent support, a latex of vinylidene chloride-acrylic acid-methyl acrylate copolymer was coated to form an undercoating layer (b) having the thickness of 120 nm.

On the undercoating layer (b), an acrylic latex (HA14, Japan Acrylic Co., Ltd.) was coated to form a second undercoating layer (b) having the thickness of 50 nm.

Formation of Filter Layer

A filter layer was formed on the second undercoating layer (b) in the same manner as in Example 1.

Formation of Hard Coating Layer and Low Refractive Index Layer

A hardcoating layer and a low refractive index layer were formed on the filter layer in the same manner as in Example 2.

The absorption spectrum of the obtained optical filter was measured. The filter layer has two absorption maximums at 530 nm and 594 nm. The transmittance at 530 nm was 70%, and the transmittance at 594 nm was 30%. The half-width of the absorption maximum at 530 nm was 110 nm, and the half-width of the absorption maximum at 594 nm was 35 nm.

EXAMPLE 4

An optical filter was prepared in the same manner as in Example 1, except that 0.08 g of the dye (c13) and 0.10 g of the dye (a6) were used in place of the dyes (b4) and (a1).

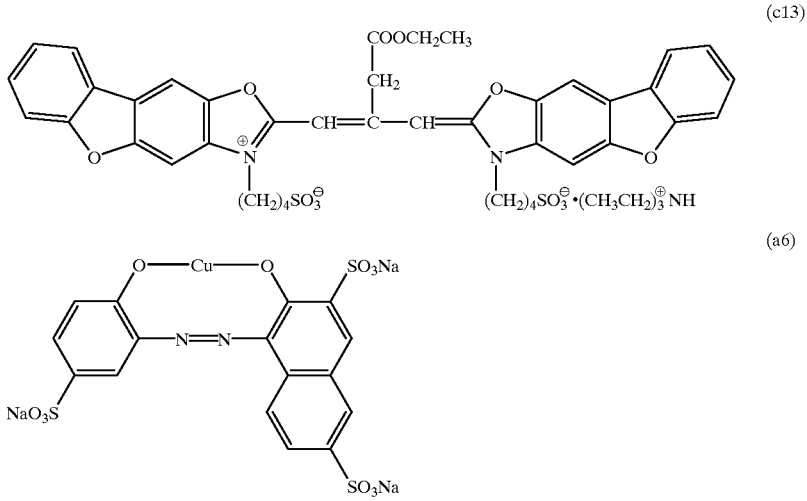

(c13)

(a6)

The absorption spectrum of the obtained optical filter was measured. The filter layer has two absorption maximums at 532 nm and 593 nm. The transmittance at 532 nm was 72%, and the transmittance at 593 nm was 4%. The half-width of the absorption maximum at 532 nm was 95 nm, and the half-width of the absorption maximum at 593 nm was 33 nm.

COMPARISON EXAMPLE 1

In 180 g of 10 wt. % aqueous solution of gelatin, 0.05 g of the dye (b3) was dissolved. The solution was stirred at 40° C. for 30 minutes, and then filtered through a polypropylene filter (porosity size: 2 μm) to prepare a coating solution for the filter layer.

(b3)

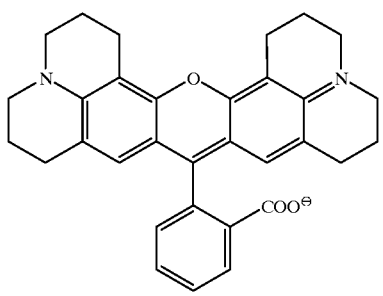

An optical filter was prepared in the same manner as in Example 1, except that the above-prepared coating solution for the filter layer was used.

The absorption spectrum of the obtained optical filter was measured. The filter layer has one absorption maximum at 596 nm. The transmittance at 596 nm was 25%, and the half-width of the absorption maximum at 596 nm was 35 nm.

COMPARISON EXAMPLE 2

In 180 g of 10 wt. % aqueous solution of gelatin, 0.05 g of the dye (a4) was dissolved. The solution was stirred at 40° C. for 30 minutes, and then filtered through a polypropylene filter (porosity size: 2 μm) to prepare a coating solution for the filter layer.

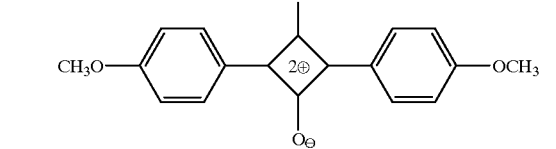

(a4)

An optical filter was prepared in the same manner as in Example 1, except that the above-prepared coating solution for the filter layer was used.

The absorption spectrum of the obtained optical filter was measured. The filter layer has one absorption maximum at 527 nm. The transmittance at 527 nm was 80%, and the half-width of the absorption maximum at 527 nm was 90 nm.

Evaluation of Optical Filters

A surface film of a front plate was removed from a commercially available plasma display panel (PDS4202J-H, Fujitsu Limited). In place of the surface film, each of the optical filters prepared in Examples 1 to 4 and Comparison Examples 1 & 2 (the surface opposite to the low refractive index layer) was attached to the front plate by using an adhesive. The contract of the displayed image was measured. Further, white light and red light were evaluated. The results are set forth in Table 1.

TABLE 1

| Optical filter | Contrast | White light | Red light |
|---|---|---|---|
| Example 1 | 15:1 | Improved | Improved |
| Example 2 | 15:1 | Improved | Improved |
| Example 3 | 15:1 | Improved | Improved |
| Example 4 | 15:1 | Improved | Improved |
| Comp. Ex. 1 | 14:1 | Not improved | Improved |
| Comp. Ex. 2 | 14:1 | Improved | Not improved |
| None | 10:1 | Not improved | Not improved |

(Remark)
Improved white light: Pure white
Improved red light: Pure red
Not improved white light: Greeny white
Not improved red light: Red tinged with orange

EXAMPLE 5

Formation of Undercoating Layer

Both surfaces of a transparent polyethylene terephthalate film (thickness: 100 μm) were subjected to a corona discharge treatment. A latex of styrene-butadiene copolymer was applied on one surface to form an undercoating layer of 130 nm thickness.

Formation of Second Undercoating Layer

On the undercoating layer, an aqueous solution of gelatin containing acetic acid and glutaric aldehyde was applied to form a second undercoating layer of 50 nm thickness.

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size: 1 μm) to prepare a coating solution for the low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Formation of Filter Layer

In 180 g of 10 wt. % aqueous solution of gelatin, 0.05 g of the cyanine dye (I-1) and 0.15 g of the oxonol dye (III-1) were dissolved. The solution was stirred at 40° C. for 30 minutes, and then filtered through a polypropylene filter (porosity size: 2 μm) to prepare a coating solution for the filter layer.

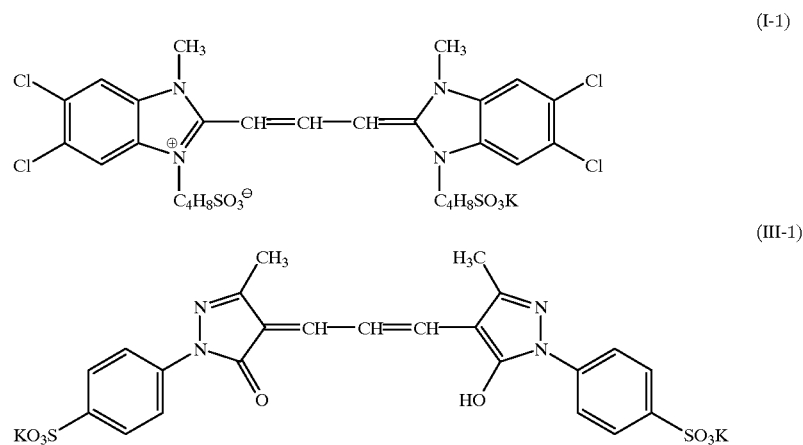

The coating solution was coated on the second undercoating layer, and dried at 120° C. for 10 minutes to form a filter layer (dry thickness: 3.5 μm).

The absorption spectrum of the obtained optical filter was measured. The results are set forth in Table 2.

EXAMPLE 6

An optical filter was prepared in the same manner as in Example 5, except that 0.15 g of the oxonol dye (III-8) was used in place of the oxonol dye (III-1).

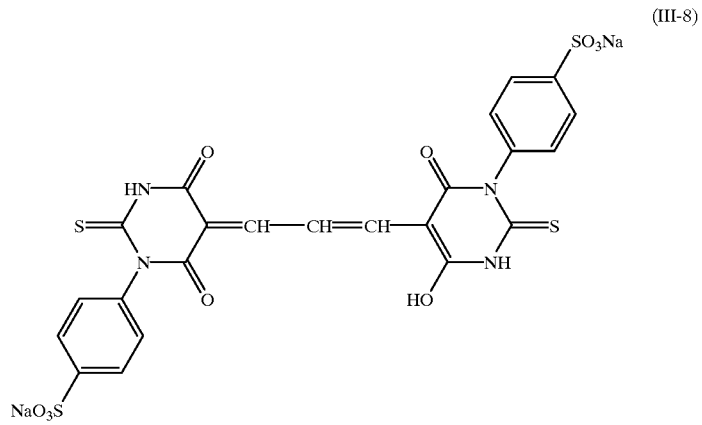

The absorption spectrum of the obtained optical filter was measured. The results are set forth in Table 2.

EXAMPLE 7

An optical filter was prepared in the same manner as in Example 5, except that 0.15 g of the merocyanine dye (IV-1) was used in place of the oxonol dye (III-1).

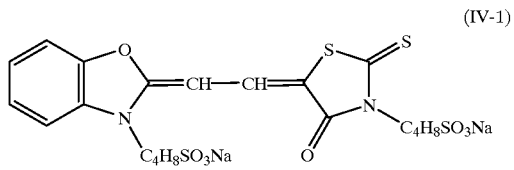

(IV-1)

The absorption spectrum of the obtained optical filter was measured. The results are set forth in Table 2.

EXAMPLE 8

An optical filter was prepared in the same manner as in Example 5, except that 0.15 g of the arylidene dye (V-1) was used in place of the oxonol dye (III-1).

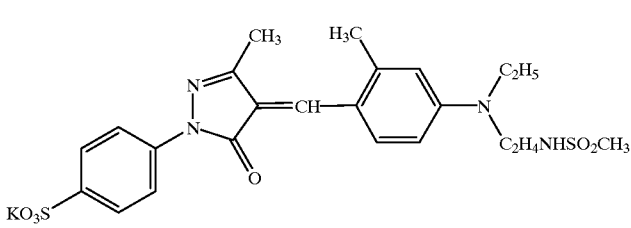

(V-1)

The absorption spectrum of the obtained optical filter was measured. The results are set forth in Table 2.

Co., Ltd.), 25 weight parts of urethane acrylate oligomer (UV-6300B, Nippon Synthetic Chemical Industry Co., Ltd.), 2 weight parts of a photopolymerization initiator (Irgacure 907, Ciba-Geigy) and 0.5 weight part of a photosensitizer (Kayacure DETX, Nippon Kayaku Co., Ltd.) were dissolved to prepare a coating solution for the hard coating layer. The coating solution was applied on the support surface opposite to the undercoating layer by using a wired bar coater. The formed layer was dried, and irradiated with ultraviolet ray to form a hard coating layer (thickness: 6 $\mu$m).

Formation of Low Refractive Index Layer

A low refractive index layer was formed on the hard coating layer in the same manner as in Example 5 by using the coating solution containing the reactive fluorocarbon polymer.

Formation of Filter Layer

In 180 g of 10 wt. % aqueous solution of gelatin, 0.05 g of the cyanine dye (I-1) and 0.15 g of the oxonol dye (III-1) were dissolved. The solution was stirred at 40° C. for 30 minutes, and then filtered through a polypropylene filter (porosity size: 2 $\mu$m) to prepare a coating solution for the filter layer.

TABLE 2

| Filter | Cyanine dye | | | | The other dye | | | |
| --- | --- | --- | --- | --- | --- | --- | --- | --- |
| | λmax | Shift | Trans | Half | λmax | Shift | Trans | Half |
| Ex. 5 | 594 nm | +84 nm | 30% | 35 nm | 533 nm | +13 nm | 65% | 65 nm |
| Ex. 6 | 594 nm | +84 nm | 29% | 35 nm | 525 nm | +8 nm | 70% | 68 nm |
| Ex. 7 | 594 nm | +84 nm | 28% | 35 nm | 525 nm | +10 nm | 69% | 67 nm |
| Ex. 8 | 594 nm | +84 nm | 30% | 35 nm | 534 nm | +8 nm | 71% | 90 nm |

(Remark)
λmax: Wavelength of the absorption maximum
Shift: Difference between λmax in the filter layer and λmax in a solution (solvent of the cyanine dye: methanol, solvent of the other dye: water)
Trans: Transmittance at λmax
Half: Half-width of λmax

EXAMPLE 9

Formation of Undercoating Layer

On one surface of a transparent cellulose triacetate film (thickness: 80 $\mu$m), a gelatin dispersion in methanol and acetone was coated, and dried to form an undercoating layer (thickness: 200 nm).

Formation of Hard Coating Layer

In 50 weight parts of methyl ethyl ketone, 25 weight parts of dipentaerythrytol hexaacrylate (DPHA, Nippon Kayaku The coating solution was coated on the undercoating layer, and dried at 120° C. for 10 minutes to form a filter layer (dry thickness: 3.5 $\mu$m).

The absorption spectrum of the obtained optical filter was measured. The results are the same as the results of the Example 5.

EXAMPLE 10

Formation of Undercoating Layers

An undercoating layer (a) and a second undercoating layer (a) were formed on one surface of a transparent polyethylene terephthalate film (thickness: 100 μm) in the same manner as in Example 5.

On the other surface of the transparent support, a latex of vinylidene chloride-acrylic acid-methyl acrylate copolymer was coated to form an undercoating layer (b) having the thickness of 120 nm.

On the undercoating layer (b), an acrylic latex (HA14, Japan Acrylic Co., Ltd.) was coated to form a second undercoating layer (b) having the thickness of 50 nm.

Formation of Filter Layer

A filter layer was formed on the second undercoating layer (b) in the same manner as in Example 5.

Formation of Hard Coating Layer and Low Refractive Index Layer

A hardcoating layer and a low refractive index layer were formed on the filter layer in the same manner as in Example 9.

The absorption spectrum of the obtained optical filter was measured. The results are the same as the results of the Example 5.

COMPARISON EXAMPLE 3

Formation of Undercoating Layer to Low Refractive Index Layer

An undercoating layer, a second undercoating layer and a low refractive index layer were formed on a transparent polyethylene terephthalate film (thickness: 100 μm) in the same manner as in Example 5.

Formation of Filter Layer

In 180 g of 10 wt. % aqueous solution of gelatin, 0.05 g of the cyanine dye (I-1) was dissolved. The solution was stirred at 40° C. for 30 minutes, and then filtered through a polypropylene filter (porosity size: 2 μm) to prepare a coating solution for the filter layer.

The coating solution was coated on the second undercoating layer, and dried at 120° C. for 10 minutes to form a filter layer (dry thickness: 3.5 μm).

The absorption spectrum of the obtained optical filter was measured. The filter layer has one absorption maximum (λmax) at 594 nm (difference between λmax in the filter layer and λmax in a solution: +84 nm). The transmittance at 594 nm was 30%, and the half-width of the absorption maximum at 594 nm was 35 nm.

COMPARISON EXAMPLE 4

Formation of Undercoating Layer to Low Refractive Index Layer

An undercoating layer, a second undercoating layer and a low refractive index layer were formed on a transparent polyethylene terephthalate film (thickness: 100 μm) in the same manner as in Example 5.

Formation of Filter Layer

In 180 g of 10 wt. % aqueous solution of gelatin, 0.15 g of the oxonol dye (III-1) was dissolved. The solution was stirred at 40° C. for 30 minutes, and then filtered through a polypropylene filter (porosity size: 2 μm) to prepare a coating solution for the filter layer.

The coating solution was coated on the second undercoating layer, and dried at 120° C. for 10 minutes to form a filter layer (dry thickness: 3.5 μm).

The absorption spectrum of the obtained optical filter was measured. The filter layer has one absorption maximum (λmax) at 533 nm (difference between λmax in the filter layer and λmax in a solution: +13 nm). The transmittance at 533 nm was 70%, and the half-width of the absorption maximum at 533 nm was 70 nm.

COMPARISON EXAMPLE 5

Formation of Undercoating Layer to Low Refractive Index Layer

An undercoating layer, a second undercoating layer and a low refractive index layer were formed on a transparent polyethylene terephthalate film (thickness: 100 μm) in the same manner as in Example 5 to prepare a comparative sample (without forming the filter layer).

Evaluation of Optical Filters

Each of the optical filters prepared in Examples 5 to 10 and Comparison Examples 3 to 5 was attached to the front plate of a commercially available plasma display panel (PDS4202J-H, Fujitsu Limited) by an adhesive in such a manner that the surface opposite to the low refractive index layer was attached to the back surface (display side) of the front plate.

The contract of the displayed image was measured. Further, white light and red light were evaluated.

The optical filter was irradiated with light (from the side opposite to the filter layer) by using a xenon lump at 100,000 lx for 100 hours. The remaining ratio of the dye was measured at 594 nm and at 530 nm. The remaining ratio (light resistance) was defined by the following formula.

Remaining ratio=100×(100-transmittance after light irradiation)/(100-transmittance before light irradiation).

The results are set forth in Table 3.

TABLE 3

| Optical filter | Cyanine dye | The other dye | Contrast | White light | Red light | Light resistance | |
|---|---|---|---|---|---|---|---|
| | | | | | | 594 nm | 530 nm |
| Ex. 5 | I-1 | III-1 | 15:1 | A | A | 92% | 93% |
| Ex. 6 | I-1 | III-8 | 15:1 | A | A | 92% | 92% |
| Ex. 7 | I-1 | IV-1 | 15:1 | A | A | 92% | 90% |
| Ex. 8 | I-1 | V-1 | 15:1 | A | A | 92% | 91% |
| Ex. 9 | I-1 | III-1 | 15:1 | A | A | 91% | 93% |
| Ex. 10 | I-1 | III-1 | 15:1 | A | A | 92% | 92% |
| Comp. 3 | I-1 | None | 14:1 | B | A | 84% | — |
| Comp. 4 | None | III-1 | 13:1 | A | B | — | 88% |
| Comp. 5 | None | None | 10:1 | B | B | — | — |

(Remark)
White light (A): Pure white (improved)
Red light (A): Pure red (improved)
White light (B): Greeny white (not improved)
Red light (B): Red tinged with orange (not improved)

EXAMPLE 11

An optical filter was prepared in the same manner as in Example 5, except that 0.15 g of the azo dye (VI-6) was used in place of the oxonol dye (III-1).

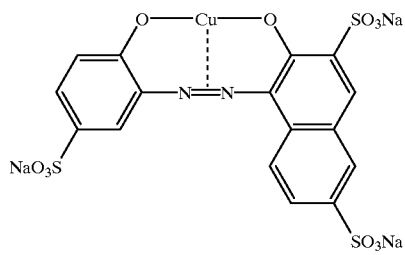
(VI-6)

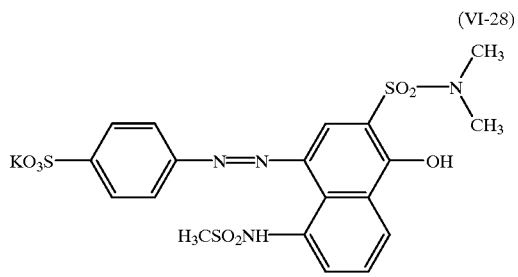
(VI-28)

The absorption spectrum of the obtained optical filter was measured. The results are set forth in Table 4.

EXAMPLE 12

An optical filter was prepared in the same manner as in Example 5, except that 0.15 g of the azo dye (VI-2) was used in place of the oxonol dye (III-1).

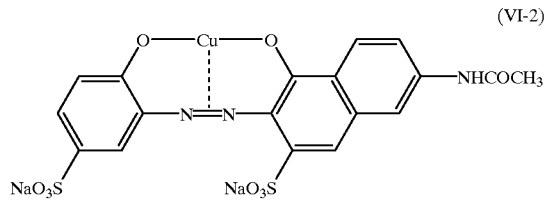
(VI-2)

The absorption spectrum of the obtained optical filter was measured. The results are set forth in Table 4.

EXAMPLE 13

An optical filter was prepared in the same manner as in Example 5, except that 0.15 g of the azo dye (VI-28) was used in place of the oxonol dye (III-1).

The absorption spectrum of the obtained optical filter was measured. The results are set forth in Table 4.

EXAMPLE 14

An optical filter was prepared in the same manner as in Example 5, except that 0.15 g of the azomethine dye (VII-2) was used in place of the oxonol dye (III-1).

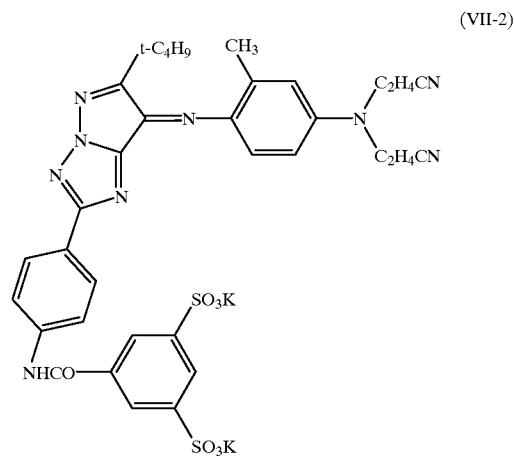
(VII-2)

The absorption spectrum of the obtained optical filter was measured. The results are set forth in Table 4.

TABLE 4

|  | Cyanine dye | | | | Azo or azomethine dye | | | |
|---|---|---|---|---|---|---|---|---|
| Filter | $\lambda$max | Shift | Trans | Half | $\lambda$max | Shift | Trans | Half |
| Ex. 11 | 594 nm | +84 nm | 30% | 35 nm | 534 nm | +11 nm | 68% | 110 nm |
| Ex. 12 | 594 nm | +84 nm | 29% | 35 nm | 532 nm | +5 nm | 70% | 113 nm |
| Ex. 13 | 594 nm | +84 nm | 28% | 35 nm | 536 nm | +25 nm | 69% | 103 nm |
| Ex. 14 | 594 nm | +84 nm | 30% | 35 nm | 534 nm | +0 nm | 71% | 93 nm |

(Remark)
$\lambda$max: Wavelength of the absorption maximum
Shift: Difference between $\lambda$max in the filter layer and $\lambda$max in a solution (solvent of the cyanine dye: methanol, solvent of the other dye: water)
Trans: Transmittance at $\lambda$max
Half: Half-width of $\lambda$max

EXAMPLE 15

An optical filter was prepared in the same manner as in Example 9, except that 0.15 g of the azo dye (VI-6) was used in place of the oxonol dye (III-1).

The absorption spectrum of the obtained optical filter was measured. The results are the same as the results of the Example 11.

EXAMPLE 16

An optical filter was prepared in the same manner as in Example 10, except that 0.15 g of the azo dye (VI-6) was used in place of the oxonol dye (III-1).

The absorption spectrum of the obtained optical filter was measured. The results are the same as the results of the Example 11.

COMPARISON EXAMPLE 6

Formation of Undercoating Layer to Low Refractive Index Layer

An undercoating layer, a second undercoating layer and a low refractive index layer were formed on a transparent polyethylene terephthalate film (thickness: 100 μm) in the same manner as in Example 5.

Formation of Filter Layer

In 180 g of 10 wt. % aqueous solution of gelatin, 0.15 g of the azo dye (VI-6) was dissolved. The solution was stirred at 40° C. for 30 minutes, and then filtered through a polypropylene filter (porosity size: 2 μm) to prepare a coating solution for the filter layer.

The coating solution was coated on the second undercoating layer, and dried at 120° C. for 10 minutes to form a filter layer (dry thickness: 3.5 μm).

The absorption spectrum of the obtained optical filter was measured. The filter layer has one absorption maximum (λmax) at 534 nm (difference between λmax in the filter layer and λmax in a solution: +11 nm). The transmittance at 533 nm was 69%, and the half-width of the absorption maximum at 534 nm was 110 nm.

Evaluation of Optical Filters

Each of the prepared optical filters was evaluated in the same manner as in Examples 5 to 10 and Comparison Examples 3 to 5.

The results are set forth in Table 5.

TABLE 5

| Optical filter | Cyanine dye | The other dye | Contrast | White light | Red light | Light resistance 594 nm | Light resistance 530 nm |
|---|---|---|---|---|---|---|---|
| Ex. 11 | I-1 | VI-6 | 15:1 | A | A | 92% | 97% |
| Ex. 12 | I-1 | VI-2 | 15:1 | A | A | 92% | 97% |
| Ex. 13 | I-1 | VI-28 | 15:1 | A | A | 92% | 95% |
| Ex. 14 | I-1 | VII-2 | 15:1 | A | A | 92% | 90% |
| Ex. 15 | I-1 | VI-6 | 15:1 | A | A | 93% | 97% |
| Ex. 16 | I-1 | VI-6 | 15:1 | A | A | 93% | 97% |
| Comp. 3 | I-1 | None | 14:1 | B | A | 84% | — |
| Comp. 6 | None | VI-6 | 13:1 | A | B | — | 97% |
| Comp. 5 | None | None | 10:1 | B | B | — | — |

(Remark)
White light (A): Pure white (improved)
Red light (A): Pure red (improved)
White light (B): Greeny white (not improved)
Red light (B): Red tinged with orange (not improved)

EXAMPLE 17

An optical filter was prepared in the same manner as in Example 5, except that 0.15 g of the anthraquinone dye (VIII-1) was used in place of the oxonol dye (III-1).

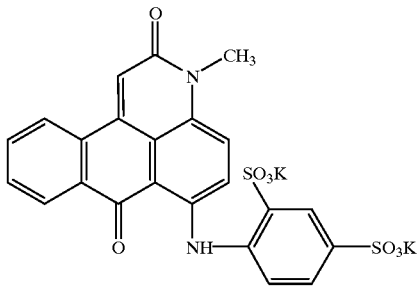

(VIII-1)

The absorption spectrum of the obtained optical filter was measured. The results are set forth in Table 6.

EXAMPLE 18

An optical filter was prepared in the same manner as in Example 5, except that 0.15 g of the anthraquinone dye (VIII-2) was used in place of the oxonol dye (III-1).

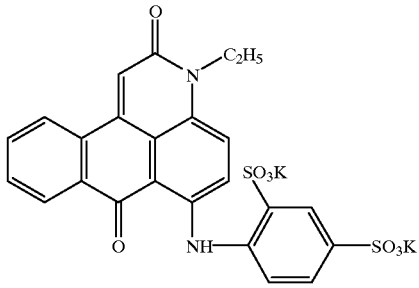

(VIII-2)

The absorption spectrum of the obtained optical filter was measured. The results are set forth in Table 6.

EXAMPLE 19

An optical filter was prepared in the same manner as in Example 5, except that 0.15 g of the anthraquinone dye (VIII-6) was used in place of the oxonol dye (III-1).

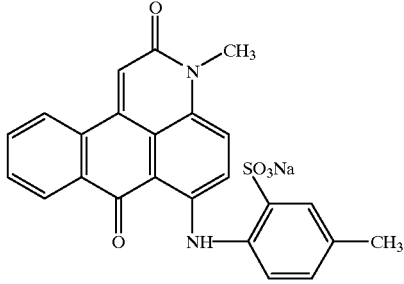

(VIII-6)

The absorption spectrum of the obtained optical filter was measured. The results are set forth in Table 6.

EXAMPLE 20

An optical filter was prepared in the same manner as in Example 5, except that 0.15 g of the anthraquinone dye (VIII-19) was used in place of the oxonol dye (III-1).

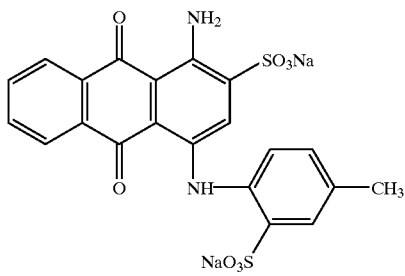

(VIII-19)

The absorption spectrum of the obtained optical filter was measured. The results are set forth in Table 6.

TABLE 6

| Fil- | Cyanine dye | | | | Anthraquinone dye | | | |
|---|---|---|---|---|---|---|---|---|
| ter | λmax | Shift | Trans | Half | λmax | Shift | Trans | Half |
| Ex.17 | 594 nm | +84 nm | 30% | 35 nm | 532 nm | +17 nm | 72% | 89 nm |
| Ex.18 | 594 nm | +84 nm | 29% | 35 nm | 531 nm | +17 nm | 70% | 90 nm |
| Ex.19 | 594 nm | +84 nm | 28% | 35 nm | 536 nm | +26 nm | 69% | 91 nm |
| Ex.20 | 594 nm | +84 nm | 30% | 35 nm | 534 nm | +19 nm | 71% | 93 nm |

(Remark)
λmax: Wavelength of the absorption maximum
Shift: Difference between λmax in the filter layer and λmax in a solution (solvent of the cyanine dye: methanol, solvent of the other dye: water)
Trans: Transmittance at λmax
Half: Half-width of λmax

EXAMPLE 21

An optical filter was prepared in the same manner as in Example 9, except that 0.15 g of the anthraquinone dye (VIII-1) was used in place of the oxonol dye (III-1).

The absorption spectrum of the obtained optical filter was measured. The results are the same as the results of the Example 17.

EXAMPLE 22

An optical filter was prepared in the same manner as in Example 10, except that 0.15 g of the anthraquinone dye (VIII-1) was used in place of the oxonol dye (III-1).

The absorption spectrum of the obtained optical filter was measured. The results are the same as the results of the Example 17.

COMPARISON EXAMPLE 7

Formation of Undercoating Layer to Low Refractive Index Layer

An undercoating layer, a second undercoating layer and a low refractive index layer were formed on a transparent polyethylene terephthalate film (thickness: 100 μm) in the same manner as in Example 5.

Formation of Filter Layer

In 180 g of 10 wt. % aqueous solution of gelatin, 0.15 g of anthraquinone dye (VIII-1) was dissolved. The solution was stirred at 40° C. for 30 minutes, and then filtered through a polypropylene filter (porosity size: 2 μm) to prepare a coating solution for the filter layer.

The coating solution was coated on the second undercoating layer, and dried at 120° C. for 10 minutes to form a filter layer (dry thickness: 3.5 μm).

The absorption spectrum of the obtained optical filter was measured. The filter layer has one absorption maximum (λmax) at 534 nm (difference between λmax in the filter layer and λmax in a solution: +17 nm). The transmittance at 534 nm was 69%, and the half-width of the absorption maximum at 534 nm was 110 nm.

Evaluation of Optical Filters

Each of the prepared optical filters was evaluated in the same manner as in Examples 5 to 10 and Comparison Examples 3 to 5.

The results are set forth in Table 7.

TABLE 7

| Optical filter | Cyanine dye | The other dye | Contrast | White light | Red light | Light resistance | |
|---|---|---|---|---|---|---|---|
| | | | | | | 594 nm | 530 nm |
| Ex.17 | I-1 | VIII-1 | 15:1 | A | A | 92% | 95% |
| Ex.18 | I-1 | VIII-2 | 15:1 | A | A | 92% | 96% |
| Ex.19 | I-1 | VIII-6 | 15:1 | A | A | 92% | 94% |
| Ex.20 | I-i | VIII-19 | 15:1 | A | A | 92% | 92% |
| Ex.21 | I-1 | VIII-1 | 15:1 | A | A | 91% | 95% |
| Ex.22 | I-1 | VIII-1 | 15:1 | A | A | 91% | 94% |
| Comp.3 | I-1 | None | 14:1 | B | A | 84% | — |
| Comp.7 | None | VIII-1 | 13:1 | A | B | — | 92% |
| Comp.5 | None | None | 10:1 | B | B | — | — |

(Remark)
White light (A): Pure white (improved)
Red light (A): Pure red (improved)
White light (B): Greeny white (not improved)
Red light (B): Red tinged with orange (not improved)

We claim:

1. An optical filter which comprises a transparent support and a filter layer, wherein the filter layer has an absorption maximum in the wavelength range of 500 to 550 nm and another absorption maximum in the wavelength range of 560 to 620 nm, and wherein the optical filter has a transmittance in the range of 40 to 85% at the absorption maximum in the wavelength range of 500 to 550 nm and a transmittance in the range of 0.01 to 80% at the absorption maximum in the wavelength range of 560 to 620 nm.

2. The optical filter as defined in claim 1, wherein the transmittance at the absorption maximum in the wavelength range of 500 to 550 nm is larger than the transmittance at the absorption maximum in the wavelength range of 560 to 620 nm.

3. The optical filter as defined in claim 1, wherein the absorption maximum in the wavelength range of 500 to 550 nm has a half-width in the range of 30 to 300 nm, and the absorption maximum in the wavelength range of 560 to 620 nm has a half-width in the range of 5 to 300 nm.

4. The optical filter as defined in claim 3, wherein the half-width of the absorption maximum in the wavelength range of 500 to 550 nm is larger than the half-width of the absorption maximum in the wavelength range of 560 to 620 nm.

5. The optical filter as defined in claim 1, wherein the filter layer contains a dye and a binder polymer.

6. The optical filter as defined in claim 5, wherein the filter layer contains a dye having an absorption maximum in the wavelength range of 500 to 550 nm and a dye having an absorption maximum in the wavelength range of 560 to 620 nm.

7. The optical filter as defined in claim 6, wherein the dye having an absorption maximum in the wavelength range of 500 to 550 nm is in a non-aggregated form and the dye having an absorption maximum in the wavelength range of 560 to 620 nm is in an aggregated form.

8. The optical filter as defined in claim 6, wherein the dye having an absorption maximum in the wavelength range of 500 to 550 nm is an oxonol dye, a merocyanine dye or an arylidene dye in a non-aggregated form.

9. The optical filter as defined in claim 6, wherein the dye having an absorption maximum in the wavelength range of 500 to 550 nm is an azo dye or an azomethine dye in a non-aggregated form.

10. The optical filter as defined in claim 6, wherein the dye having an absorption maximum in the wavelength range of 500 to 550 nm is an anthraquinone dye in a non-aggregated form.

11. The optical filter as defined in claim 6, wherein the dye having an absorption maximum in the wavelength range of 560 to 620 nm is a cyanine dye in an aggregated form.

12. The optical filter as defined in claim 1, wherein the optical filter further comprises a low refractive index layer having a refractive index lower than a refractive index of the support.

13. The optical filter as defined in claim 12, wherein the optical filter comprises the filter layer, the transparent support and the low refractive index layer in this order.

14. The optical filter as defined in claim 13, wherein the optical filter further comprises a hard coating layer between the transparent support and the low refractive index layer, said hard coating layer being harder than the support.

15. The optical filter as defined in claim 12, wherein the optical filter comprises the transparent support, the filter layer and the low refractive index layer in this order.

16. The optical filter as defined in claim 15, wherein the optical filter further comprises a hard coating layer between the filter layer and the low refractive index layer, said hard coating layer being harder than the support.

17. A plasma display panel having a display surface covered with an optical filter which comprises a transparent support and a filter layer, wherein the filter layer has an absorption maximum in the wavelength range of 500 to 550 nm and another absorption maximum in the wavelength range of 560 to 620 nm, and wherein the optical filter has a transmittance in the range of 40 to 85% at the absorption maximum in the wavelength range of 500 to 550 nm and a transmittance in the range of 0.01 to 80% at the absorption maximum in the wavelength range of 560 to 620 nm.

* * * * *